United States Patent
Hagihara et al.

(10) Patent No.: US 12,086,313 B2
(45) Date of Patent: Sep. 10, 2024

(54) MOTION DETECTION SYSTEM

(71) Applicant: LINTEC CORPORATION, Tokyo (JP)

(72) Inventors: Yoshiaki Hagihara, Itabashi-ku (JP); Shinichi Yamagiwa, Tsukuba (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 17/801,117

(22) PCT Filed: Feb. 16, 2021

(86) PCT No.: PCT/JP2021/005759
§ 371 (c)(1),
(2) Date: Aug. 19, 2022

(87) PCT Pub. No.: WO2021/192737
PCT Pub. Date: Sep. 30, 2021

(65) Prior Publication Data
US 2023/0085521 A1    Mar. 16, 2023

(30) Foreign Application Priority Data
Mar. 24, 2020    (JP) ................. 2020-053263

(51) Int. Cl.
*G06F 3/01*    (2006.01)
*A41D 19/00*    (2006.01)

(52) U.S. Cl.
CPC ......... *G06F 3/014* (2013.01); *A41D 19/0027* (2013.01)

(58) Field of Classification Search
CPC .......................... G06F 3/014; A41D 19/0027
See application file for complete search history.

(56) References Cited

U.S. PATENT DOCUMENTS

| | | | |
|---|---|---|---|
| 10,474,236 B1 | 11/2019 | Stewart et al. | |
| 2014/0152761 A1* | 6/2014 | Homma | H04N 7/15 348/14.08 |
| 2015/0376821 A1 | 12/2015 | McMaster | |
| 2016/0162022 A1* | 6/2016 | Seth | G06F 3/014 345/156 |
| 2017/0038839 A1 | 2/2017 | Seth | |
| 2017/0215495 A1 | 8/2017 | Okumiya et al. | |

(Continued)

FOREIGN PATENT DOCUMENTS

| | | |
|---|---|---|
| JP | 2016-080675 A | 5/2016 |
| JP | 2016-130940 A | 7/2016 |

(Continued)

OTHER PUBLICATIONS

International Search Report issued in corresponding International Patent Application No. PCT/JP2021/005759, dated May 11, 2021, with English translation.

(Continued)

*Primary Examiner* — Towfiq Elahi
(74) *Attorney, Agent, or Firm* — Rimon P.C.

(57) ABSTRACT

A communication unit transmits, to a server, motion information that is detected by a motion detection unit for detecting motion information about a mounted body by using a motion detection member mounted on the mounted body, and a motion determination unit determines what kind of motion is indicated by the motion information.

17 Claims, 32 Drawing Sheets

(56) References Cited

U.S. PATENT DOCUMENTS

| | | |
|---|---|---|
| 2018/0101231 A1 | 4/2018 | Seth |
| 2019/0146583 A1 | 5/2019 | Seth |
| 2019/0354180 A1 | 11/2019 | Seth |
| 2020/0029635 A1 | 1/2020 | Kiemele et al. |
| 2020/0060371 A1 | 2/2020 | Maezawa |
| 2020/0159320 A1 | 5/2020 | Seth |
| 2022/0043515 A1 | 2/2022 | Seth |

FOREIGN PATENT DOCUMENTS

| | | | |
|---|---|---|---|
| JP | 2017-061770 A | 3/2017 | |
| JP | 2018-504682 A | 2/2018 | |
| JP | 2018-141717 A | 9/2018 | |
| WO | WO-2018037855 A1 * | 3/2018 | ............... A61B 5/02 |

OTHER PUBLICATIONS

Partial Supplementary European Search Report issued in the corresponding European patent Application No. 21775744.2 dated Mar. 25, 2024.

Extended European Search Report received in EP Application No. 21775744.2, dated Jul. 1, 2024.

* cited by examiner

MOTION DETECTION SYSTEM

CROSS REFERENCE TO RELATED APPLICATIONS

This application is the U.S. National Phase under 35 U.S.C. § 371 of International Application No. PCT/JP2021/005759 filed on Feb. 16, 2021, which claims the benefit of Japanese Application No. 2020-053263, filed on Mar. 24, 2020, the entire contents of each are hereby incorporated by reference.

TECHNICAL FIELD

The present disclosure relates to a motion detection system.

BACKGROUND ART

Conventionally, for example, a motion detection system is known that uses a motion detection member for detecting the motion of body parts (such as an elbow, knee, waist, or finger) and the like.

As the motion detection member, for example, Patent Document 1 discloses "a glove-type input device to be worn on a hand to detect the motion and the shape of the hand of a user, the glove-type input device including a sensing device for detecting motion of a finger joint by using a stretchable conductive ink on an outer side and/or an inner side of a glove configured from a material capable of expanding/contracting."

In addition, Patent Document 2 discloses "a glove equipped with a strain sensor, the glove comprising: a glove body that can be worn on a hand of a wearer; one or a plurality of sheet-like strain sensors that are provided to a portion other than a surface on the palm side of the glove body and to a joint-corresponding portion and that expand and contract so as to follow deformation of the glove body; and a stretchable wiring part that is provided integrally with the glove body and provided to deform so as to follow the deformation of the glove body.".

Patent Document 1: Japanese Patent Application Laid-Open No. 2016-130940

Patent Document 2: Japanese Patent Application Laid-Open No. 2017-061770

SUMMARY OF INVENTION

Technical Problem

However, in the methods of Patent Document 1 and Patent Document 2, although it is possible to detect that the finger joint moves, there is a problem that it is not possible to accurately detect what kind of motion the mounted body has performed.

Therefore, an object of the present disclosure is to provide a motion detection system capable of accurately detecting what kind of motion the mounted body has performed.

Solution to Problem

A motion detection system of the present disclosure includes: a motion detection unit that detects motion information about a mounted body by using a motion detection member mounted on the mounted body; a communication unit that transmits, to a server, the motion information detected by the motion detection unit; and a motion determination unit that determines what kind of motion is indicated by the motion information.

Advantageous Effects of Invention

According to the present disclosure, it is possible to provide a motion detection system capable of accurately detecting what kind of motion a mounted body has performed.

DESCRIPTION OF EMBODIMENTS

Figure 1:
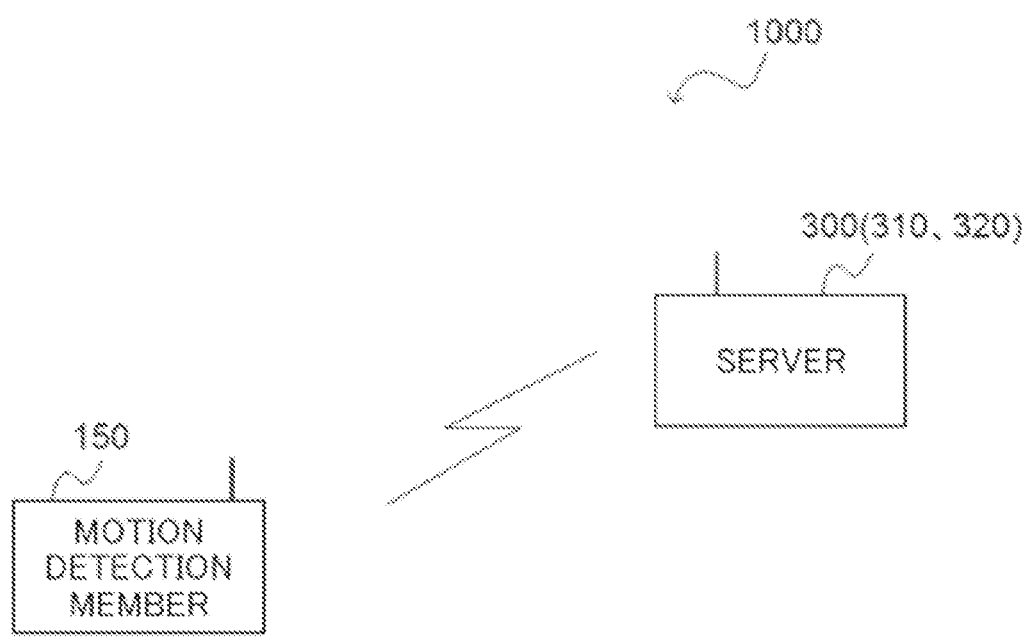
FIG. 1 is a diagram illustrating a configuration of a motion detection system according to the present embodiment.

<Configuration of Motion Detection System According to Embodiment of Present Disclosure>

Hereinafter, examples of embodiments of the technology of the disclosure will be described with reference to the drawings. Note that, in the drawings, the same or equivalent constituent elements and portions are assigned the same reference signs. Here, the dimensional ratios in the drawings are exaggerated for convenience of description, and may be different from the actual ratios.

FIG. 1 is a diagram illustrating a configuration of a motion detection system 1000 according to the present embodiment. As illustrated in FIG. 1, the motion detection system 1000 includes a motion detection member 150 and a server 300. The motion detection member 150 and the server 300 execute wireless communication.

<Motion Detection Member>

Hereinafter, an outline of the motion detection member will be described. Note that, in the present disclosure, a numerical range using "to" means a numerical range in which numerical values indicated before and after "to" are included as a minimum value and a maximum value, respectively.

The motion detection member is a member for detecting the motion of a mounted body. As the motion detection member, an expansion/contraction sensor that detects motion from expansion/contraction of a hand, or a time-axis detection-type sensor that detects motion from an inclination or a position of a hand, such as an acceleration sensor, an angular velocity sensor, or a magnetic sensor, can be adopted. In the present embodiment, a case where the motion detection member is an expansion/contraction sensor will be described by way of example.

A motion detection member according to the present embodiment includes: a mounting part that is mounted on a mounted body, the mounting part having an expanding/contracting portion that expands/contracts due to motion of the mounted body; and a wiring electrode part provided with: a wiring part provided to at least a portion of the expanding/contrasting portion of the mounting part, the wiring part having a first wiring part including a conductive linear body and a second wiring part including a conductive linear body, and an electrode part having a first electrode part electrically connected to the first wiring part and a second electrode part electrically connected to the second wiring part, wherein, when the expanding/contracting portion of the mounting part to which the wiring part is provided expands/contracts due to motion of the mounted body, a contact state of the first wiring part and the second wiring part changes, thereby causing a resistance value between the first electrode part and the second electrode part to change.

In the motion detection member according to the present embodiment, when the expanding/contracting portion expands/contracts (that is, expands and contracts) due to motion of the mounted body, a contact state between the first wiring part and the second wiring part changes, thereby causing a resistance value between the first electrode part and the second electrode part to change. By detecting the change in the resistance value, it is possible to detect the motion of the mounted body.

Further, in the motion detection member according to the present embodiment, the wiring electrode part for detecting motion is configured from a conductive linear body. Therefore, durability is also high.

In addition, a wiring part configured from a conductive linear body is provided to an expanding/contracting portion of the mounting part configured from a stretchable cloth material. Therefore, discomfort is not readily induced when the motion detection member is mounted on the mounted body, and the mounting feeling is excellent.

Further, the glove-type input device, the glove equipped with a strain sensor, and the like, of Patent Document 1 require calibration in a state where a hand is open and a state where the hand is closed, but if a glove is continuously used, a sensor position is shifted, and there is a possibility of detection accuracy being reduced. However, the motion detection member according to the present embodiment does not require calibration, can be used immediately after mounting, and has a wide permissible range of positional deviation.

Here, in the present disclosure, "the resistance value between the first electrode part and the second electrode part changes" indicates that 1) the resistance value increases or decreases when the state between the first electrode part and the second electrode part is a conductive state, or that 2) the state between the first electrode part and the second electrode part changes from a conductive state to a non-conductive state or from a non-conductive state to a conductive state. Note that the change in the resistance value does not include a change in the resistance value due to damage of the electrode part, the wiring part, and the junction between the electrode part and the wiring part.

The phrase "at least a portion of the first wiring part and the second wiring part are in contact" also includes an embodiment in which, in a case where another wiring part other than the first wiring part and the second wiring part (for example, a third wiring part) is included, at least respective portions of the first wiring part and the second wiring part are in contact, and the other wiring part is interposed therebetween.

"The wiring part is provided to the expanding/contracting portion" indicates that "the wiring part is provided to the front surface of a stretchable cloth material" or "the wiring part is provided inside the stretchable cloth material".

Further, "the wiring part is provided to the front surface of the stretchable cloth material" indicates that the wiring part (that is, the conductive linear body) is provided to a cloth material layer that constitutes the front and back surfaces of the stretchable cloth material (also including the cloth material layer partially constituting the front and back surfaces). In other words, "the wiring part is provided to the front surface of the stretchable cloth material" indicates that the electrode part or the wiring part (that is, the conductive linear body) is provided in a state where at least a portion of the conductive linear body constituting the wiring part is exposed via the stretchable cloth material.

However, "the wiring part is provided inside a stretchable cloth material" indicates that the wiring part (that is, the conductive linear body) is provided in the inner layer of the stretchable cloth material, for example, in the cloth material layer serving as the inner layer of the stretchable cloth material or between the cloth material layers.

"The mounting part has an expanding/contracting portion configured from a stretchable cloth material" encompasses both an embodiment in which a position corresponding to the expanding/contracting portion of the mounting part is configured from a stretchable cloth material, and a wiring part is provided to the stretchable cloth material, and an embodiment in which a stretchable cloth material having a wiring part is separately bonded to the front surface in a position corresponding to the expanding/contracting portion of the mounting part. Note that examples of the method of providing the expanding/contracting portion include bonding using an adhesive, attachment by sewing, and the like.

(Configuration of Motion Detection Member)

Figure 2:
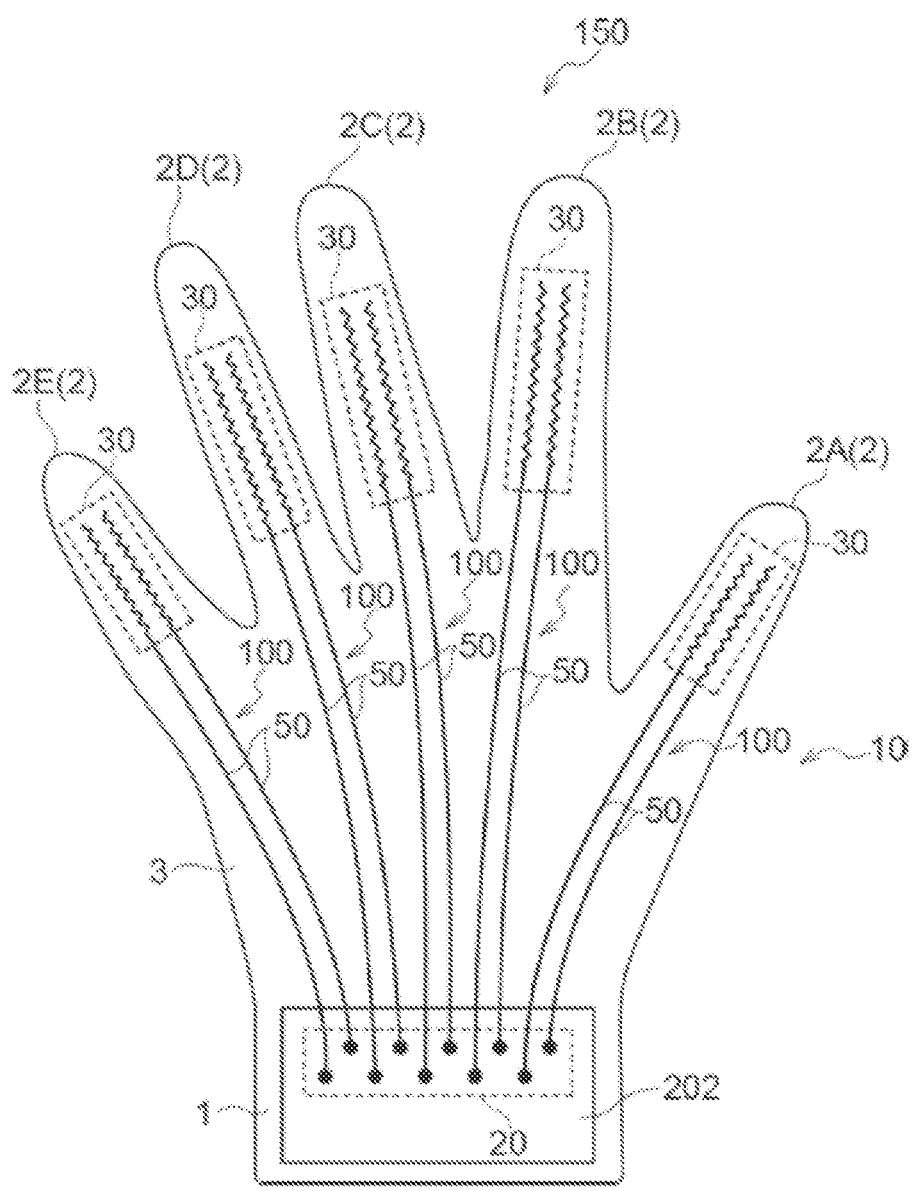
FIG. 2 is a schematic plan view illustrating a motion detection member according to the present embodiment.

Hereinafter, an example of the motion detection member according to the present embodiment will be described with reference to the drawings. The motion detection member 150 according to the present embodiment is a cloth material having electrode wiring. In the present embodiment, a case where the motion detection member 150 is a glove-like member as illustrated in FIG. 2 will be described by way of example. Specifically, the motion detection member 150 includes, for example, a glove-like mounting part 10 (an example of a mounting part), a wiring electrode part 100, and a communication module 202.

(Glove-Like Mounting Part)

The glove-like mounting part 10 is a glove-like mounting part that is mounted on a hand of a human body serving as a mounted body.

The glove-like mounting part 10 includes a wrist part 1 mounted on a wrist of a human body, a finger part 2 mounted on a finger of the human body, and a body part 3 connecting the wrist part 1 and the finger part 2.

Note that a connecting part connecting the wrist part 1, the finger part 2, and the body part 3 (a portion corresponding to the metacarpophalangeal joint), and the finger part 2 (a portion corresponding to the distal interphalangeal joint and the proximal interphalangeal joint) corresponds to an example of the "expanding/contracting portion that expands/contracts due to motion of the mounted body".

Here, a portion of the finger part 2 facing the dorsal side of the proximal interphalangeal joint corresponds to an example of the "expanding/contracting portion of the mounting part provided with the wiring part".

Here, the glove-like mounting part 10 includes, for example, five finger parts 2 corresponding to each finger. Specifically, the glove-like mounting part 10 has, as the finger parts 2, for example, a thumb part 2A that is mounted on the thumb, an index finger part 2B that is mounted on the index finger, a middle finger part 2C that is mounted on the middle finger, a ring finger part 2D that is mounted on the ring finger, and a little finger part 2E that is mounted on the little finger.

However, the configuration of the finger part 2 is not limited to the configuration. The glove-like mounting part 10 may include, as the finger part 2, for example, two portions, namely, a thumb part that is mounted on the thumb, and a finger part that is mounted on the index finger, the middle finger, the ring finger, and the little finger.

The glove-like mounting part 10 is configured, for example, from triple (three layers of) cloth material layers, namely, a front surface cloth material layer 10A constituting a front surface, a back surface cloth material layer 10B constituting a back surface, and an intermediate cloth material layer 10C provided between the front surface cloth material layer 10A and the back surface cloth material layer 10B.

The glove-like mounting part 10 may be configured, for example, from one (single) cloth material layer, or from double (two) or quadruple (four) cloth material layers or more in addition to the triple cloth material layers.

Note that multiple mounting parts configured from two or more cloth material layers may be manufactured by, for example, a method of manufacturing each cloth material layer and then sewing same together, or multiple glove-like mounting parts 10 may be collectively manufactured by a weaving and knitting machine.

The glove-like mounting part 10 is configured from a stretchable cloth material, for example. However, it is sufficient to configure the glove-like mounting part 10 from a flexible cloth material, and to configure at least a portion of the finger part 2 facing the dorsal side of the proximal interphalangeal joint (an example of the expanding/contracting portion of the mounting part provided with the wiring part) from a stretchable cloth material.

Typical examples of the stretchable cloth material are woven or knitted fabrics. The glove-like mounting part 10 may also be a nonwoven fabric.

Examples of woven or knitted fabrics include woven fabrics such as plain weave, twill weave, satin weave, and well-known weave applications; and knitted fabrics such as weft knitting, warp knitting, lace knitting, and well-known knitting applications.

The yarn (linear body) constituting the stretchable cloth material is an insulating yarn. The insulating yarn refers to a yarn having a line resistance of $1.0 \times 10^6$ Ω/cm or more. The line resistance of the insulating yarn is a line resistance measured using the same method as for the line resistance of the conductive linear body described subsequently.

As the stretchable cloth material, a woven or knitted fabric using an elastic yarn is preferably applied.

Examples of the elastic yarn include a covered yarn (single covered yarn or double covered yarn) for which an inelastic yarn is wound in a coil shape around an outer periphery of an elastic yarn, a core spun yarn for which an elastic yarn and an inelastic yarn are spun and twisted, an air-interlaced covered yarn for which an inelastic yarn is wound around an outer periphery of an elastic yarn using a pneumatic nozzle, and a twisted yarn for which an elastic yarn and an inelastic yarn are twisted.

Examples of the elastic yarn include yarns of fibers exhibiting so-called rubber-like elasticity, such as polyurethane elastic fibers, polyester elastic fibers, and polyarnide elastic fibers.

Examples of the inelastic yarn include yarns of synthetic fibers (polyester fiber, polyarnide fiber, acrylic fiber, polypropylene fiber, and rayon fiber) and natural fibers (fibers such as cotton, silk, hemp, and wool).

(Wiring Electrode Part)

A wiring electrode part 100 includes an electrode part 20, a wiring part 30, and a wiring part 50.

The electrode part 20 includes a first electrode part 20A and a second electrode part 20B, and is electrically connected to the communication module 202.

The wiring part 30 (hereinafter, referred to as the "detection wiring part 30") has a first wiring part 30A and a second wiring part 30B, and in the wiring part 30, a contact state between the first wiring part 30A and the second wiring part 30B changes when a portion of the finger part 2 facing a dorsal side of a proximal interphalangeal joint of a finger expands/contracts (hereinafter also referred to as "when the expanding/contracting portion of the finger part 2 expands/contracts") due to bending of the proximal interphalangeal joint of the finger (an example of motion of a mounted body).

The wiring part 50 has a first wiring part 50A and a second wiring part 50B, and is a connection wiring part (hereinafter referred to as the "connection wiring part 50") for electrically connecting the electrode part 20 and the wiring part 30.

Note that the connection wiring part 50 is a wiring part that is provided if necessary, and the electrode part 20 and the detection wiring part 30 may be directly connected.

—Electrode Part—in the electrode part 20, the first electrode part 20A and the second electrode part 20B are each provided, for example, on the dorsal side of the wrist part 1 of the glove-like mounting part 10. However, the arrangement position of the electrodes is not particularly limited, and may be, for example, the palm side of the wrist part 1 of the glove-like mounting part 10 or the palm side of the body part 3 of the glove-like mounting part 10.

Note that three or more electrode parts 20 may be provided depending on the purpose. For example, one electrode part may be a common electrode, and two or more wiring parts 50 may be connected to one electrode part, Examples of the present embodiment include an embodiment in which one of the two wiring parts 50 connected to the detection wiring part 30 disposed on the ring finger part 2D and one of the two wiring parts 50 connected to the detection wiring part 30 disposed on the little finger part 2E are connected to one electrode part serving as a common electrode.

Figure 3:
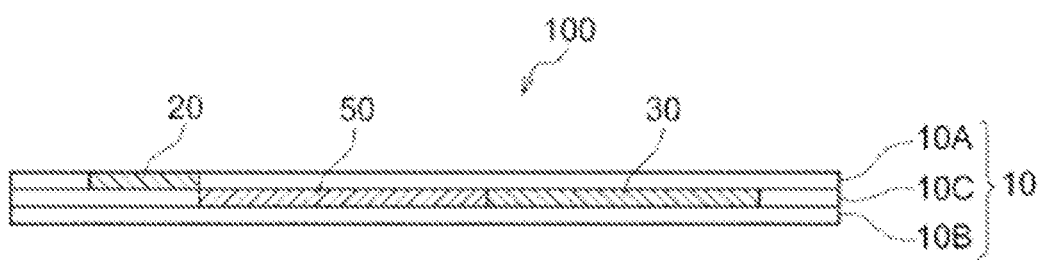
FIG. 3 is a schematic cross-sectional view illustrating the motion detection member according to the present embodiment.

For example, as illustrated in FIG. 3, the electrode part 20 is provided to the front surface cloth material layer 10A of the glove-like mounting part 10. That is, the electrode part 20 is provided to the front surface of the glove-like mounting part 10.

Note that the electrode part 20 may be provided to the intermediate cloth material layer 10C of the glove-like mounting part 10. That is, the electrode part 20 may be provided inside the glove-like mounting part 10, This is because, even when the electrode part 20 is provided inside the glove-like mounting part 10, a connection can be established using a pin-shaped electrode or the like.

—Detection Wiring Part—The detection wiring part 30 is provided to a portion of the finger part 2 (all parts: the thumb part 2A, index finger part 2B, middle finger part 2C, ring finger part 2D, and little finger part 2E) facing the dorsal side of the proximal interphalangeal joint of the finger.

However, the arrangement position of the detection wiring part 30 is not limited to that of the foregoing embodiment, and may be as per the following embodiments, depending on the purpose:

An embodiment in which the detection wiring part 30 is provided to a portion of the finger part 2 facing the dorsal side of the proximal interphalangeal joint and/or the dorsal side of the metacarpophalangeal joint of the finger.

An embodiment in which the detection wiring part 30 is provided to a portion of the finger part 2 facing the palm side of the proximal interphalangeal joint and/or the palm side of the metacarpophalangeal joint of the finger.

An embodiment in which a portion of the plurality of detection wiring parts 30 is provided in a position facing the portion of the finger part 2 facing the dorsal side of the finger, and the other portion is provided in a position facing the portion of the finger part 2 facing the palm side of the finger. For example, an embodiment in which a detection wiring part 30 is provided in a position facing the portion of the thumb part 2A facing the palm side of the thumb, and the detection wiring part 30 is provided in a position facing the portions of the index linger part 2B, the middle finger part 2C, the ring finger part 2D, and the little finger part 2E that face the dorsal side of the index finger part, the middle finger part, the ring finger part, and the little finger part.

An embodiment in which the detection wiring part 30 is provided to at least one of the thumb part 2A, the index finger part 2B, the middle finger part 2C, the ring finger part 2D, and the little finger part 2E.

In the detection wiring part 30, the first detection wiring part 30A is electrically connected to the first electrode part 20A. Further, the second detection wiring part 30B is electrically connected to the second electrode part 20B.

The first detection wiring part 30A and the second detection wiring part 30B are provided separately and at least partially in contact with each other in a state before expansion of the expanding/contracting portion of the finger part 2.

However, in a case where a portion of the detection wiring parts 30 is provided in a position facing the portion of the thumb part 2A facing the palm side of the finger (for example, in a case where a detection wiring part 30 is provided in a position facing the portion of the thumb part 2A facing the palm side of the thumb, and a detection wiring part 30 is provided in a position facing the portions of the index finger part 2B, the middle finger part 2C, the ring finger part 2D, and the little linger part 2E facing the dorsal side of the index finger part, the middle finger part, the ring finger part, and the little finger part), in the detection wiring part 30 in a position facing the portion of the thumb part 2A facing the palm side of the thumb, the first detection wiring part 30A and the second detection wiring part 30B are provided separately and spaced apart from each other in a state before expansion of the expanding/contracting portion of the finger part 2.

Note that an embodiment in which the first detection wiring part 30A and the second detection wiring part 30B are provided separately, spaced apart from each other in a state before expansion of the expanding/contracting portion of the finger part 2, will be described in a first modification.

The first detection wiring part 30A extends, fix example, along the longitudinal direction of the finger part 2. The first detection wiring part 30A has a wave-shaped part 32A that is obtained by providing a conductive linear body 40A2 in a wave shape.

The second detection wiring part 30B extends, fix example, along the longitudinal direction of the finger part 2, The second detection wiring part 30B also has a wave-shaped part 32B that is obtained by providing a conductive linear body 40B2 in a wave shape.

In a state before expansion of the expanding/contracting portion of the finger part 2, the wave-shaped part 32A of the first detection wiring part 30A and the wave-shaped part 32B of the second detection wiring part 30B are in point contact or line contact with each other.

Note that both the first detection wiring part 30A and the second detection wiring part 30B need not have a wave-shaped part that is obtained by providing the conductive linear body 40A2 and the conductive linear body 40B2 in a wave shape, and may be configured to have only a linear part provided in a straight line. Further, the first detection wiring part 30A and the second detection wiring part 30B may both have a bent part that is obtained by bending the conductive linear body 40A2 and the conductive linear body 40B2.

The detection wiring part 30 is provided inside the glove-like mounting part 10. Specifically, for example, as illustrated in FIG. 3, because the detection wiring parts 30 are provided in the intermediate cloth material layer 10C, which is a cloth material layer (including a cloth material layer partially serving as an inner layer) of the inner layer of the glove-like mounting part 10 that is configured from three cloth material layers, the detection wiring parts 30 can be provided inside the glove-like mounting part 10. Here, for example, the detection wiring part 30 may be provided between the cloth material layers of the glove-like mounting part 10, which is configured from two cloth material layers.

Note that the detection wiring part 30 may be provided to the front surface of the glove-like mounting part 10. For example, the detection wiring part 30 may be provided to the front surface cloth material layer 10A or the back surface cloth material layer 10B of a glove-like mounting part 10 that is configured from three cloth material layers. However, the detection wiring part 30 is preferably provided inside the glove-like mounting part 10 from the viewpoint of insulation from the outside by the glove-like mounting part 10.

—Connection Wiring Part 50—

In the connection wiring part 50, the first connection wiring part 50A electrically connects the first electrode part 20A and the first wiring part 30A. The second connection wiring part 50B electrically connects the second electrode part 20B and the second wiring part 30B.

The connection wiring part 50 is provided to the body part 3 of the glove-like mounting part 10 facing the dorsal side of the hand.

However, the arrangement position of the connection wiring part 50 is not limited to the embodiment, and is set according to the arrangement positions of the electrode part 20 and the detection wiring part 30.

The connection wiring part 50 is provided inside the glove-like mounting part 10. Specifically, for example, because the connection wiring part 50 is provided in the intermediate cloth material layer 10C, which is the cloth material layer (including the cloth material layer that partially becomes the inner layer) of the inner layer of the glove-like mounting part 10 configured from three cloth material layers, the connection wiring part 50 can be provided inside the glove-like mounting part 10. Here, for example, the connection wiring part 50 may be provided between the cloth material layers of the glove-like mounting part 10, which is configured from two cloth material layers.

Note that the connection wiring part 50 may be provided to the front surface of the glove-like mounting part 10. For example, the connection wiring part 50 may be provided to the front surface cloth material layer 10A or the back surface cloth material layer 10B of the glove-like mounting part 10, which is configured from three cloth material layers. However, the connection wiring part 50 is preferably provided inside the glove-like mounting part 10 from the viewpoint of insulation from the outside by the glove-like mounting part 10.

—Conductive Linear Body—

Each of the electrode part 20, the detection wiring part 30, and the connection wiring part 50 includes a conductive linear body 40. That is, the region where the conductive linear body 40 is disposed is used for the electrode pan 20, the detection wiring part 30, and the connection wiring part 50.

Specifically, for example, the first electrode part 20A includes a conductive linear body 40A1.

The first connection wiring part 50A includes a conductive linear body 40A3 obtained by extending the conductive linear body 40A1 of the first electrode part 20A.

The first detection wiring part 30A includes a conductive linear body 40A2 obtained by extending the conductive linear body 40A3 of the first connection wiring part 50A.

That is, the first electrode part 20A and the first detection wiring part 30A are configured from at least the same conductive linear body 40.

Here, for example, the second electrode part 20B includes a conductive linear body 40B1.

The second connection wiring part 50B includes a conductive linear body 40B3 obtained by extending the conductive linear body 40B1 of the second electrode part 20B.

The second detection wiring part 30B includes a conductive linear body 40B2 obtained by extending the conductive linear body 40B3 of the second connection wiring part 50B.

That is, the second electrode part 20B and the second detection wiring part 30B are configured from at least the same conductive linear body 40.

Because the first electrode part 20A and the first detection wiring part 30A, and the second electrode part 20B and the second detection wiring part 30B respectively, are configured from the same conductive linear body 40, a connection failure between the electrode parts 20 and the detection wiring parts 30 is suppressed.

Note that the same one conductive linear body 40 also includes a linear body in which end portions of the conductive linear body 40 are connected to each other by knotting, twisting, or the like without using a connecting material (solder, conductive paste, or the like) or a connecting member (crimping, a connector, or the like) other than the linear body.

However, each of the electrode part 20, the detection wiring part 30, and the connection wiring part 50 may include a plurality of conductive linear bodies 40. Here, the first electrode part 20A, the first detection wiring part 30A, and the first connection wiring part 50A, and the second electrode part 20B, the second detection wiring part 3013, and the second connection wiring part 50B, respectively, need not be configured from the same conductive linear body 40.

For example, the ends of the conductive linear bodies 40 of the first electrode part 20A, the first detection wiring part 30A, and the first connection wiring part 50A, and of the second electrode part 20B, the second detection wiring part 30B, and the second connection wiring part 50B, respectively, may be connected to each other using a connecting material (solder, conductive paste, or the like) or a connecting member (crimping, a connector, or the like) other than the linear body.

In at least one of the electrode part 20, the detection wiring part 30, and the connection wiring part 50, for example, at least a portion of the conductive linear body 40 is bound by the yarn of the glove-like mounting part 10.

Such an embodiment is preferable from the viewpoint that the conductive linear body 40 functioning as a conductive material can also be used as a means for fixing to the glove-like mounting part 10 as the electrode part 20, the detection wiring part 30, and the connection wiring part 50.

The conductive linear body 40 bound to the glove-like mounting part 10 may be the same single conductive linear body 40 included in the electrode part 20, the detection wiring part 30, and the connection wiring part 50, or may be another conductive linear body 40 included in only one of the electrode part 20, the detection wiring part 30, and the connection wiring part 50.

In at least one of the electrode part 20, the detection wiring part 30, and the connection wiring part 50, the conductive linear body 40 need not be bound by the yarn of the glove-like mounting part 10.

For example, in a case where at least one of the electrode part 20, the detection wiring part 30, and the connection wiring part 50 is fixed to the glove-like mounting part 10 using an adhesive, when at least one of the electrode part 20, the detection wiring part 30, and the connection wiring part 50 is sewn to the glove-like mounting part 10 by using an insulating yarn, at least one of the electrode part 20, the detection wiring part 30, and the connection wiring part 50 can be fixed to the glove-like mounting part 10 even when the conductive linear body 40 is not bound by the yarn of the glove-like mounting part 10.

For example, a rectangular region in which the conductive linear bodies 40 are repeatedly bent or curved at 180° is formed. This rectangular region is formed by binding a portion of the conductive linear body 40 to the yarn of the front surface cloth material layer 10A of the glove-like mounting part 10. Further, this rectangular region may be used as a planar electrode part 20.

Note that a region in which conductive linear bodies 40 are arranged in a spiral shape may be used as the electrode part 20. Here, an arbitrary planar shape (polygon, circle, or the like) in which the conductive linear body 40 is bent or curved may be used as the electrode part 20.

Meanwhile, a region is formed in which the conductive linear body 40 is extended from the electrode part 20 in a linear shape, a wave shape, a bent shape, or a combination thereof. This region is formed by binding a portion of the conductive linear body 40 to the yarn of the intermediate cloth material layer 10C of the glove-like mounting part 10. This region may be used as the detection wiring part 30 and the connection wiring part 50.

Figure 7:
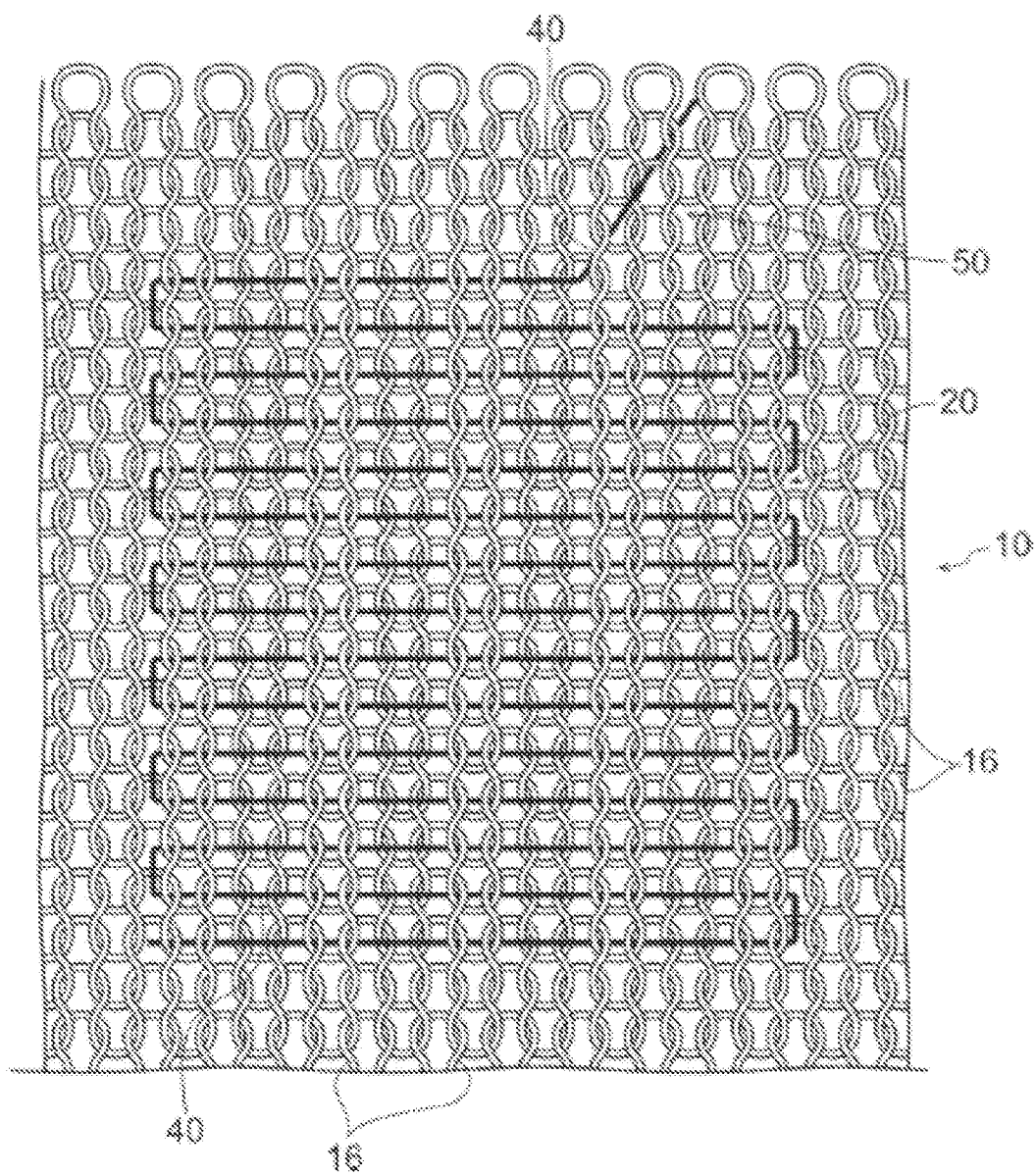
FIG. 7 is a schematic plan view illustrating an example in which conductive linear bodies are knitted in the motion detection member according to the present embodiment.

Specifically, in a case where the glove-like mounting part 10 is a woven fabric, as illustrated in FIG. 7, the electrode part 20, the detection wiring part 30, and the connection wiring part 50 are preferably configured by weaving the conductive linear bodies 40 into a woven structure of a woven fabric that is woven with warps and wefts, from the viewpoint that the glove-like mounting part 10, the electrode part 20, the detection wiring part 30, and the connection wiring part 50 can be simultaneously formed when the glove-like mounting part 10 is formed by weaving, and from the viewpoint of improving the integrity of the glove-like mounting part 10, the electrode part 20, the detection wiring part 30, and the connection wiring part 50.

In a case where the glove-like mounting part 10 is a knitted item, as illustrated in FIG. 7, it is preferable that the electrode part 20, the detection wiring part 30, and the connection wiring part 50 are configured by interweaving the conductive linear bodies 40 in the aforementioned shape into a knitting pattern of the knitted item in which a loop-shaped yarn is interwoven, from the viewpoint that the glove-like mounting part 10, the electrode part 20, the detection wiring part 30, and the connection wiring part 50 can be simultaneously formed when the glove-like mounting part 10 is formed by knitting, and from the viewpoint of improving the integrity of the glove-like mounting part 10, the electrode part 20, the detection wiring part 30, and the connection wiring part 50.

In the case of interweaving the conductive linear bodies 40 into the network structure of the knitted fabric, for example, aligned knitting, plating knitting, inlay knitting, and the like can be adopted. FIG. 7 illustrates an example in which the conductive linear body 40 is woven by adopting inlay knitting.

Figure 8:
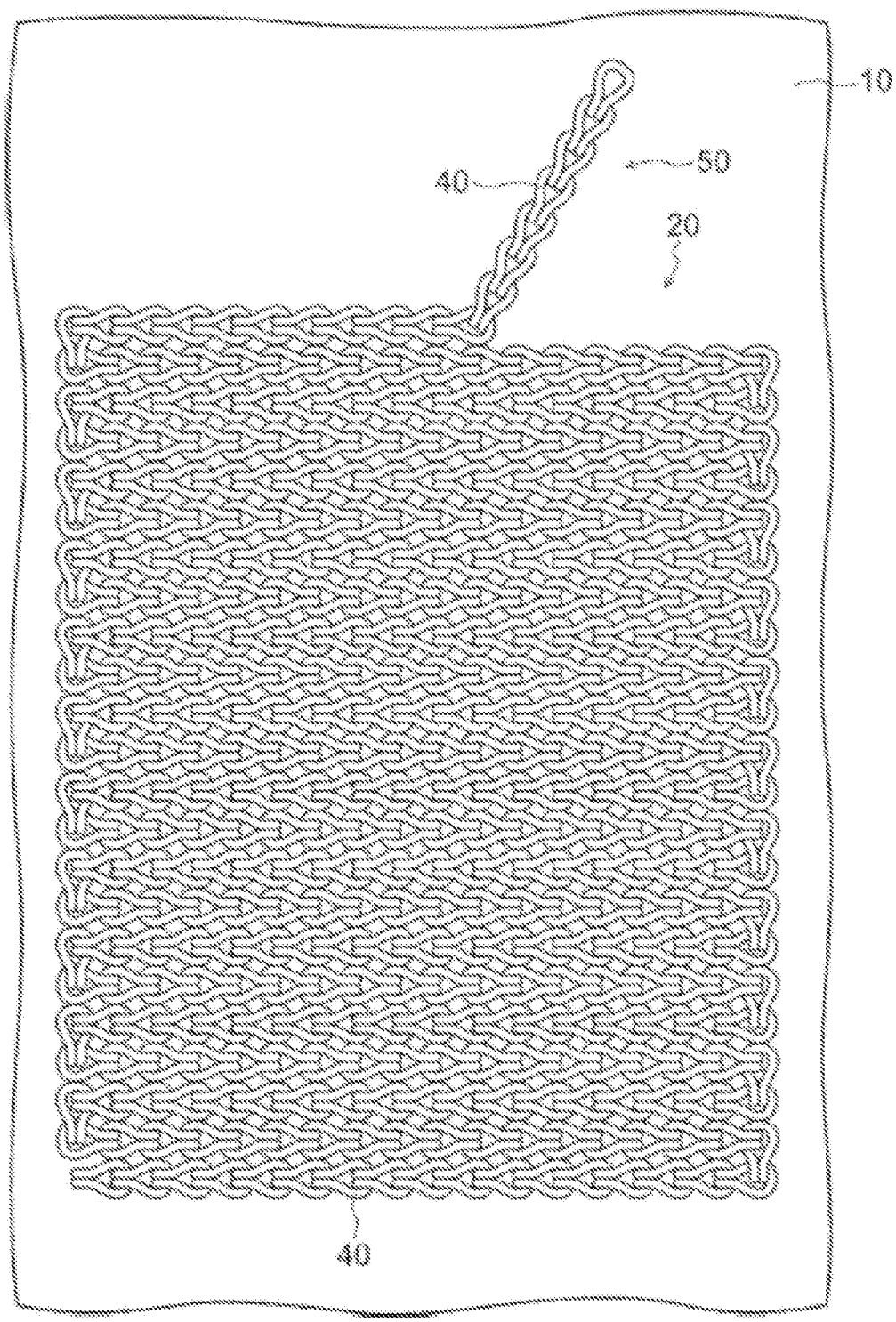
FIG. 8 is a schematic plan view illustrating an example in which conductive linear bodies are embroidered in the motion detection member according to the present embodiment.

Here, as illustrated in FIG. 8, it is preferable that the electrode part 20, the detection wiring part 30, and the connection wiring part 50 are configured by embroidering the conductive linear body 40 in the aforementioned shape with respect to the glove-like mounting part 10, from the viewpoint that the electrode part 20, the detection wiring part 30, and the connection wiring part 50 can also be fixed to the glove-like mounting part 10 at the same time when the electrode part 20, the detection wiring part 30, and the connection wiring part 50 are formed.

For example, a well-known stitch such as a running stitch, a coaching stitch, a back stitch, a chain stitch, and an outline stitch can be adopted as the embroidering method. FIG. 8 illustrates an example in which the conductive linear body 40 is embroidered using chain stitches.

Here, it is preferable that the electrode part 20, the detection wiring part 30, and the connection wiring part 50 are sewn and fixed to the glove-like mounting part 10 by the conductive linear body 40, from the viewpoint that the conductive linear body 40 constituting the electrode part 20, the conductive linear body 40 fixing the detection wiring part 30, and the conductive linear body 40 fixing the connection wiring part 50 can be made common.

For example, examples of embodiments in which the electrode part 20, the detection wiring part 30, and the connection wiring part 50 are sewn and fixed by the conductive linear body 40 include an embodiment in which: the electrode part 20, the detection wiring part 30, and the connection wiring part 50 are continuously formed from a woven fabric in which the conductive linear body 40 is woven or a knitted fabric in which the conductive linear body 40 is knitted; and the electrode part 20, the detection wiring part 30, and the connection wiring part 50 are sewn to the glove-like mounting part 10 by using the conductive linear body 40.

Figure 6:
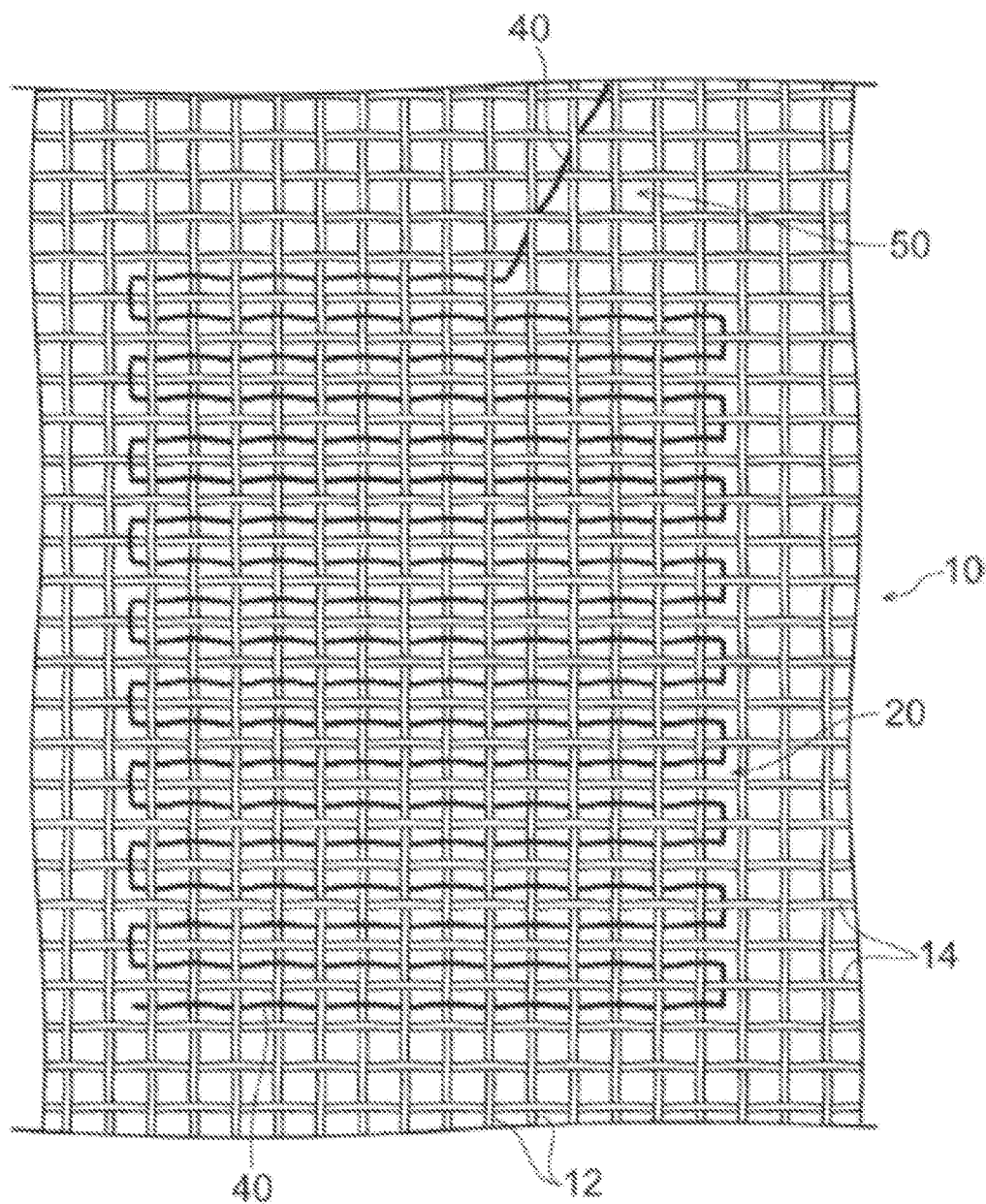
FIG. 6 is a schematic plan view illustrating an example in which conductive linear bodies are interwoven in the motion detection member according to the present embodiment.

In FIG. 6, reference sign 12 denotes a warp constituting the glove-like mounting part 10 (woven fabric), and reference sign 14 denotes a weft constituting the glove-like mounting part 10 (woven fabric). In FIG. 7, reference sign 16 denotes a yarn that constitutes the glove-like mounting part 10 (woven fabric).

Note that, when the elastic yarn is adopted as the yarn constituting the glove-like mounting part 10, the conductive linear bodies 40 may be woven or knitted into the glove-like mounting part 10 while forming a woven or knitted fabric in a state where the elastic yarn has expanded.

(Conductive Linear Body)

The conductive linear body constituting the electrode part 20, the detection wiring part 30, and the connection wiring part 50 is not particularly limited as long as same has conductivity, and examples thereof include a linear body including a metal wire, and a linear body including a conductive yarn. The conductive linear body 40 may also be a linear body including a metal wire and a conductive yarn (a linear body obtained by twisting a metal wire and a conductive yarn, or the like).

Because both the linear body including the metal wire and the linear body including the conductive yarn have high electrical conductivity, when applied as the conductive linear body 40, the resistance of the electrode part 20, the detection wiring part 30, and the connection wiring part 50 can be easily reduced.

Examples of the metal wire include wires containing a metal such as copper, aluminum, tungsten, iron, molybdenum, nickel, titanium, silver, or gold, or an alloy (for example, steel such as stainless steel and carbon steel, or brass, phosphor bronze, zirconium copper alloy, beryllium copper, iron nickel, nichrome, nickel titanium, Kanthal, Hastelloy, rhenium tungsten, and the like) containing two or more kinds of metals. Further, the metal wire may be plated with tin, zinc, silver, nickel, chromium, a nickel-chromium alloy, solder, or the like, or may have a surface coated with a carbon material or a polymer (described subsequently).

Examples of the metal wire also include a metal wire coated with a carbon material. When the metal wire is coated with a carbon material, metal corrosion is suppressed.

Examples of the carbon material covering the metal wire include amorphous carbon such as carbon black, activated carbon, hard carbon, soft carbon, mesoporous carbon, and carbon fiber; graphite; fulierene; graphene; carbon nanotubes, and the like.

Meanwhile, the linear body including the conductive yarn may be a linear body composed of one conductive yarn or a may be a linear body obtained by twisting a plurality of conductive yarns. Here, the conductive yarn and the insulating yarn may be twisted. The linear body including the conductive yarn has higher flexibility than the linear body including the metal wire, and has an advantage that disconnection due to weaving, knitting, or embroidering of the glove-like mounting part 10, or sewing of the glove-like mounting part 10, does not readily occur.

Examples of the conductive yarn include: a yarn (hereinafter, a carbon nanotube yarn) that contains conductive fibers (metal fibers, carbon fibers, fibers of an ion-conductive polymer, and the like); a yarn containing conductive fine particles (carbon nanoparticl es and the like); a yarn having a surface which is plated or vapor-deposited with a metal (copper, silver, nickel, and the like), and a yarn impregnated with a metal oxide.

Suitable examples of a, linear body that includes a conductive yarn include, in particular, a linear body that includes a carbon nanotube yarn (hereinafter also referred to as the "carbon nanotube linear body").

The carbon nanotube linear body is obtained, for example, by drawing a carbon nanotube in a sheet shape from an end of a carbon nanotube forest (a growth body obtained by growing a plurality of carbon nanotubes on a substrate such that the carbon nanotubes are oriented in a direction perpendicular to the substrate, which may be referred to as an "array"), bundling the drawn carbon nanotube sheets, and then twisting a bundle of carbon nanotuhes. In such a manufacturing method, when no twist is applied during twisting, a ribbon-shaped carbon nanotube linear body is obtained, and when a twist is applied, a yarn-like linear body is obtained. The ribbon-shaped carbon nanotube linear body is a linear body having no structure in which a set of a plurality of carbon nanotuhes is twisted. In addition, a carbon nanotube linear body can also be obtained by spinning from a dispersion liquid of carbon nanotuhes, or the like. The manufacturing of the carbon nanotube linear body by spinning can be carried out, for example, using the method disclosed in US Patent Publication No. 2013/0251619 (JP Laid-Open Application No. 2011-253140). From the viewpoint of obtaining uniformity of the diameter of the carbon nanotube linear body, it is desirable to use a yarn-like carbon nanotube linear body, and from the viewpoint of obtaining a carbon nanotube linear body of high purity, it is preferable to obtain a yarn-like carbon nanotube linear body by twisting a carbon nanotube sheet. The carbon nanotube linear body may be a linear body in which two or more carbon nanotube linear bodies are twisted with each other.

The carbon nanotube linear body may be a linear body (hereinafter also referred to as the "composite linear body") that includes a carbon nanotube and a conductive material other than a carbon nanotube, such as metal, a conductive polymer, or graphene. The composite linear body readily improves the conductivity of the linear body while maintaining the aforementioned characteristics of the carbon nanotube linear body.

Examples of linear bodies including carbon nanotubes and a metal that serve as the composite linear body include: (1) a composite linear body in which a single metal or a metal alloy is carried on the surface of a carbon-nanotube forest, sheet or bundle, or a twisted linear body by vapor deposition, ion plating, sputtering, wet plating, or the like, in the process of drawing carbon nanotubes in a sheet shape from the end of the carbon nanotube forest, bundling the drawn carbon nanotube sheets, and then obtaining a carbon nanotube linear body in which a bundle of carbon nanotubes is twisted: (2) a composite linear body obtained by twisting together a bundle of carbon nanotubes with: a linear body of a single metal, a linear body of a metal alloy, or a composite linear body; and (3) a composite linear body obtained by twisting together a carbon nanotube linear body or a composite linear body with: a linear body of a single metal, a linear body of a metal alloy, or a composite linear body. Note that, in the composite linear body of (2), when a bundle of carbon nanotubes is twisted, a metal may be carried on the carbon nanotubes as per the composite linear body of (1). Here, the composite linear body of (3) is a composite linear body obtained by knitting two linear bodies; however, as long as at least one linear body of a single metal, a linear body of a metal alloy, or a composite linear body is included, three or more carbon nanotube linear bodies, linear bodies of a single metal, linear bodies of a metal alloy, or composite linear bodies ma be knitted together.

Examples of possible metals for the composite linear body include: simple metals such as gold, silver, copper, iron, aluminum, nickel, chromium, tin, and zinc, and alloys that include at least one of these simple metals (copper-nickel-phosphorus alloy, copper-iron-phosphorus-zinc alloy, and the like).

Among these conductive linear bodies 40, conductive linear bodies that include a carbon nanotube yarn (in particular, a conductive linear body including only a carbon nanotube yarn or a conductive linear body including a carbon nanotube yarn and a nonmetallic conductive material) are preferable.

For example, a yarn that has a metal (copper, silver, nickel, and the like) plated or vapor-deposited on its surface or a yarn impregnated with a metal oxide will likely be subject to cracks in the metal or metal oxide when expansion/contraction is repeated, and hence durability is low. In this regard, the carbon nanotube linear bodies have strong resistance to bending, and even when the expanding/contracting portion of the finger part 2 repeatedly expands/contracts, the resistance value of the wiring part hardly changes. The carbon nanotube linear bodies also have the advantage of exhibiting high corrosion resistance.

Here, the linear resistance of the conductive linear body 40 is preferably $5.0 \times 10^{-3}$ Ω/cm to $1.0 \times 10^{3}$ Ω/cm, and more preferably $1.0 \times 10^{-2}$ Ω/cm to $5.0 \times 10^{2}$ Ω/cm.

The line resistance of the conductive linear body 40 is measured as follows. First, a silver paste is applied to both ends of the conductive linear body 40, and the resistance of a portion between the silver pastes is measured to determine the resistance value (unit: Ω) of the conductive linear body 40. The resistance value thus obtained is then divided by the distance (cm) between the silver pastes to calculate the line resistance of the conductive linear body 40.

(Communication Module)

The communication module 202 is provided, for example, on the dorsal side of the wrist part 1 of the glove-like mounting part 10. However, the arrangement position of the communication module 202 is not particularly limited, and may be, for example, the palm side of the wrist part 1 of the glove-like mounting part 10 or the palm side of the body part of the glove-like mounting part 10.

The communication module 202 is electrically connected to the electrode part 20 via a connection terminal (not illustrated).

The communication module 202 is detachably provided on the glove-like mounting part 10 by a means such as a hook-and-loop fastener, for example. By taking out the communication module 202 from the glove-like mounting part 10, the motion detection member 150 can be selected without performing waterproofing on the communication module.

Figure 5:
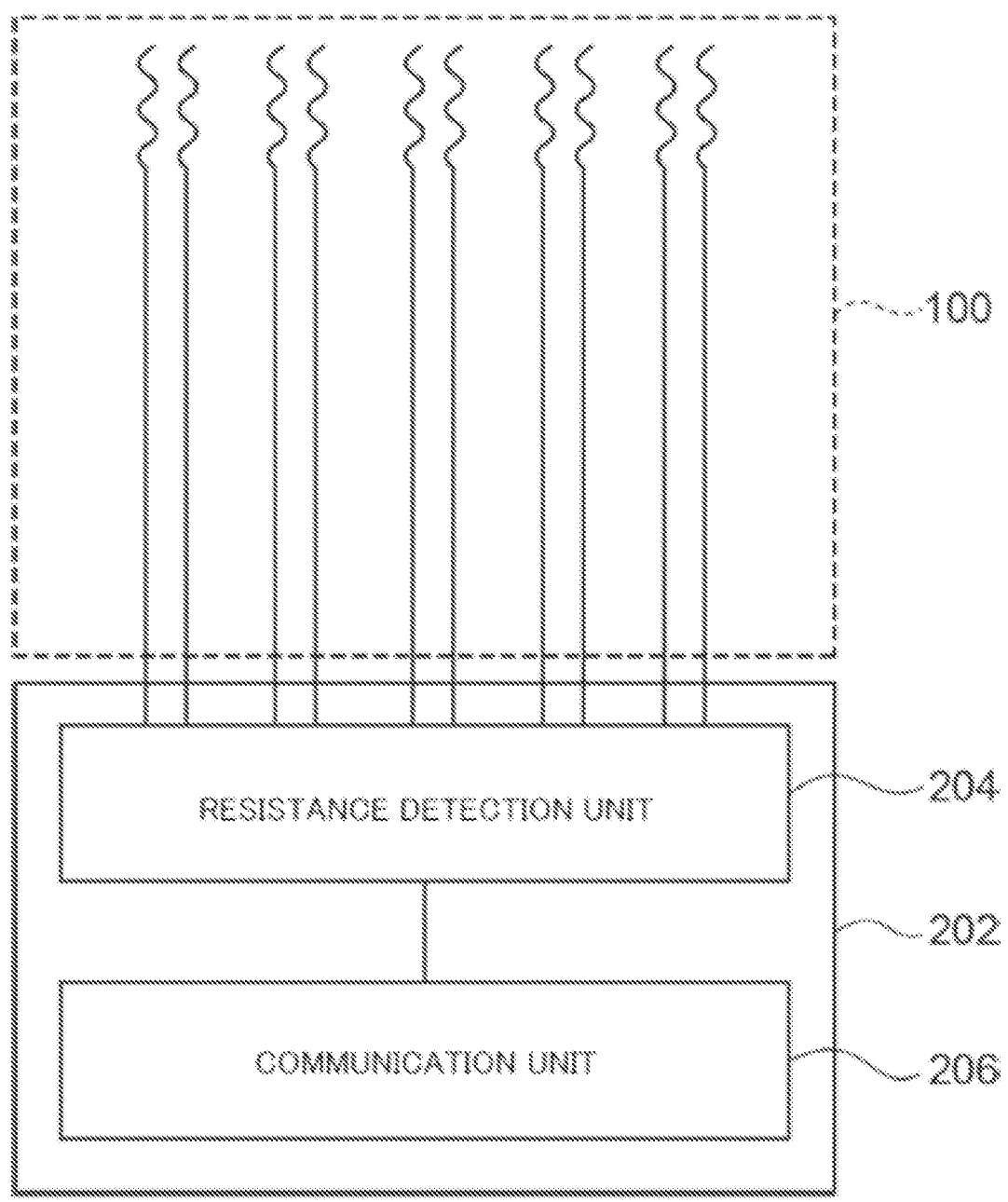
FIG. 5 is a block diagram illustrating the motion detection member according to the present embodiment.

The communication module 202 has a resistance detection unit 204 and a communication unit 206 (FIG. 5). Note that the communication module 202 also has a power supply unit (not illustrated).

The resistance detection unit 204 is a sensor for detecting a resistance value. The resistance detection unit 204 functionally detects the resistance value between the first electrode part 20A and the second electrode part 20B. The resistance detection unit 204 then delivers the detected resistance value to the communication unit 206. Thus, the resistance detection unit 204 detects the motion information about the mounted body from the motion detection member 150 mounted on the mounted body.

The communication unit 206 is a communication device for performing wireless communication with the server 300. When directly communicating with the server 300, the communication unit 206 conforms to standards such as IEEE 802.15.1 and IEEE 802.15.4. Note that, in a case of performing communication with the server 300 via a wireless base station or a wireless router, the communication unit 206 directly communicates with the wireless base station or the wireless router in compliance with a standard such as Wi-Fi (registered trademark) or LIE, for example. Here, the communication unit 206 may be configured to transmit data of the detected resistance value to the server 300 in a wired manner. The communication unit 206 functionally transmits the data of the resistance value detected by the resistance detection unit 204 to the server 300.

(Action of Motion Detection Member)

Figure 4A:
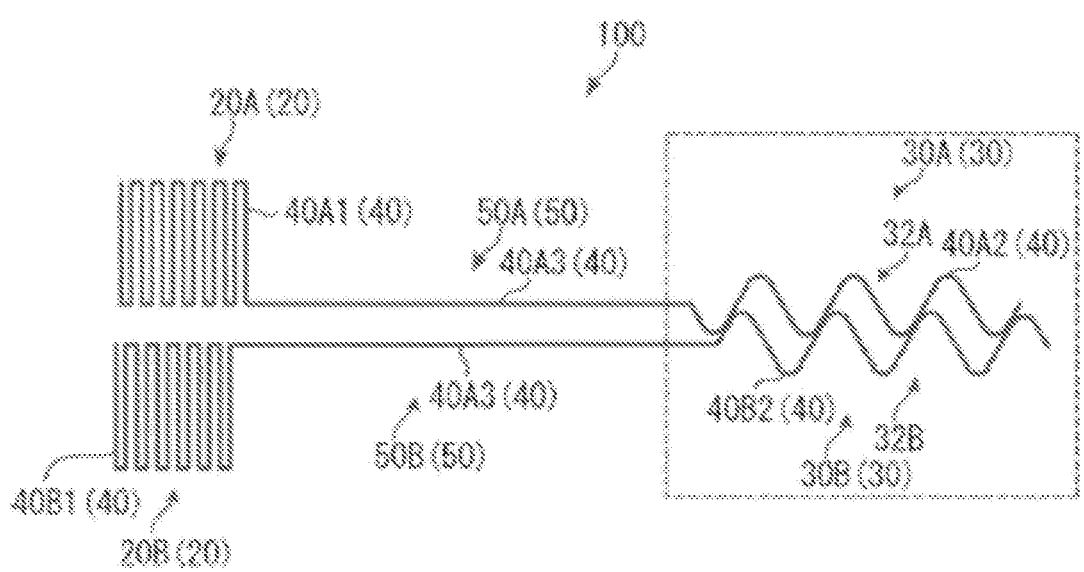
FIG. 4A is a schematic plan view illustrating an expanding/contracting portion (an example of an expanding part of a mounting part provided with a wiring part) of the motion detection member according to the present embodiment.

In the motion detection member 150 according to the present embodiment, at least respective portions (in the present embodiment, the wave-shaped parts 32A and 32B) of the first detection wiring part 30A and the second detection wiring part 30B are in contact with each other in a state before expansion of the expanding/contracting portion of the finger part 2 in the glove-like mounting part 10 (see FIG. 4A). Specifically, at least a portion of the conductive linear body 40A2 constituting the first detection wiring part 30A and the conductive linear body 40B2 constituting the second detection wiring part 30B are in contact with each other.

Figure 4B:
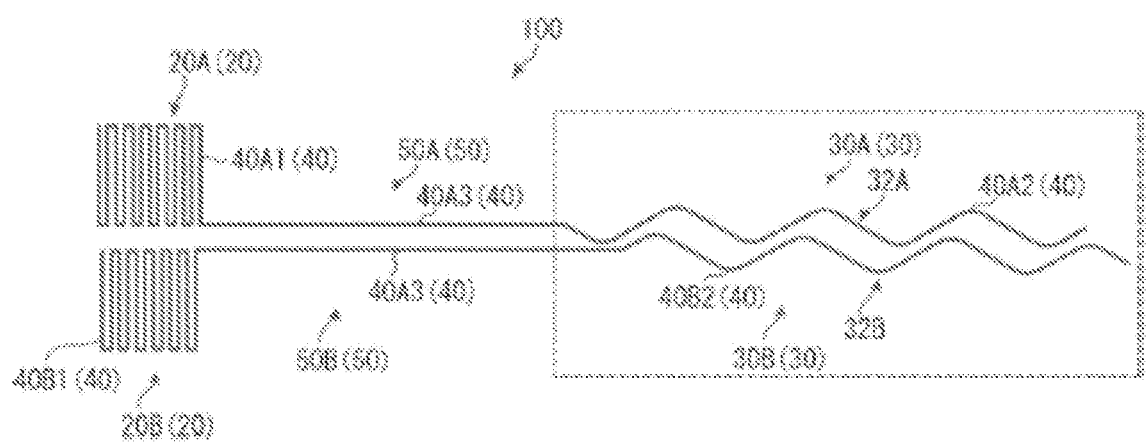
FIG. 4B is a schematic plan view illustrating an expanded state of an expanding/contracting portion of a finger part (an example of an expanding part of a mounting part provided with a wiring part) of the motion detection member according to the present embodiment.

However, when the expanding/contracting portion of the finger part 2 in the glove-like mounting part 10 expands due to bending of the finger of the hand (bending of the proximal interphalangeal joint), the first detection wiring part 30A and the second detection wiring part 30B are spaced apart from each other at the moment when a certain expansion rate is reached (see FIG. 4B). Specifically, the conductive linear body 40A2 constituting the first detection wiring part 30A and the conductive linear body 40B2 constituting the second detection wiring part 30B are spaced apart from each other.

More specifically, when the expanding/contracting portion of the finger part 2 expands, the period of the wave-shaped part 32A of the first detection wiring part 30A and the wave-shaped part 32B of the second detection wiring part 30B becomes long, and the amplitude thereof becomes small. As a result, the first detection wiring part 30A and the second detection wiring part 30B are spaced apart from each other.

When the expanding/contracting portion of the finger part 2 expands due to this motion, the resistance value between the first electrode part 20A and the second electrode part 20B changes, That is, the resistance value increases. Specifically, the first electrode part 20A and the second electrode part 20B shift from a state of conduction therebetween to a state of non-conduction.

The motion of the finger (bending of the proximal interphalangeal joint of the finger) can then be detected by detecting the change in resistance value between the first electrode part 20A and the second electrode part 20B that accompanies the expansion.

However, when the bending of the finger of the hand (the bending of the proximal interphalangeal joint) is released and the expansion of the expanding/contracting portion of the finger part 2 is released (that is, when the finger part contracts), at least a portion of the first detection wiring part 30A and the second detection wiring part 30B, which have been spaced apart, come into contact with each other at the moment when a certain expansion rate is reached (see FIG. 4A). That is, the resistance value is reduced. Specifically, the first electrode part 20A and the second electrode part 20B shift from a state of non-conduction therebetween to a state of conduction.

Thus, the motion of a finger (release of bending of the proximal interphalangeal joint of the finger) can be detected by detecting a change in the resistance value between the first electrode part 20A and the second electrode part 20B that accompanies the expansion and contraction.

Figure 9:
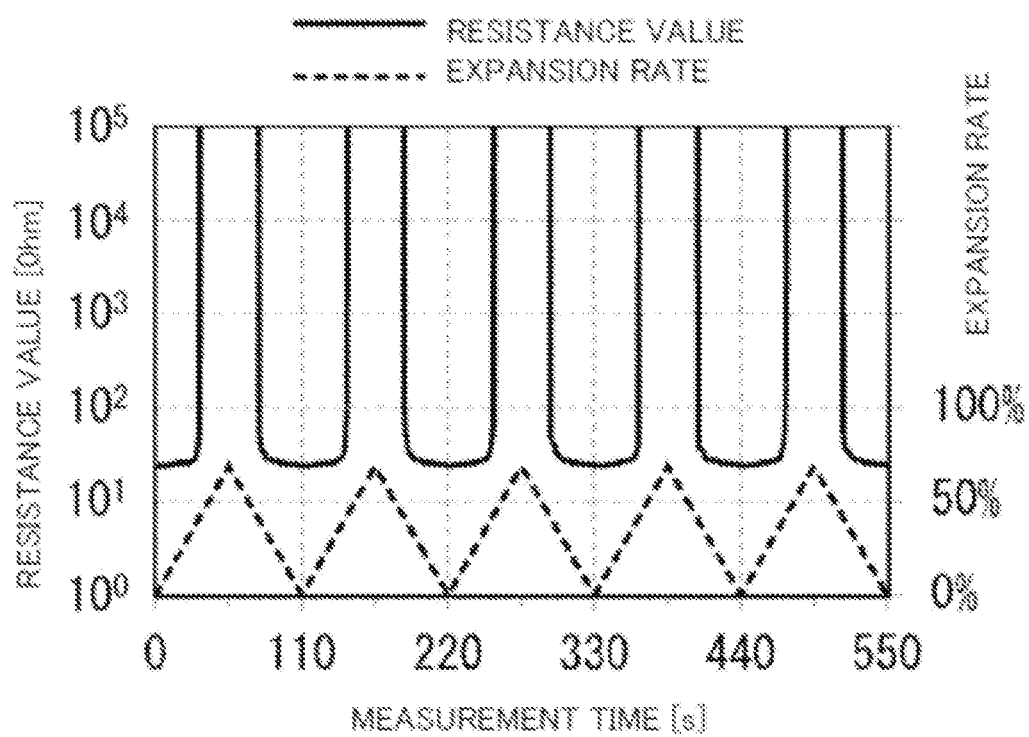
FIG. 9 is a diagram illustrating an example of a "relationship between a resistance value between a first electrode part and a second electrode part, and a measurement time, and a relationship between an expansion rate and the measurement time" in a case in which expansion and contraction of an expanding/contracting portion (an example of an expanding part of a mounting part provided with a wiring part) up to a maximum expansion rate are repeated five times.
Figure 10:
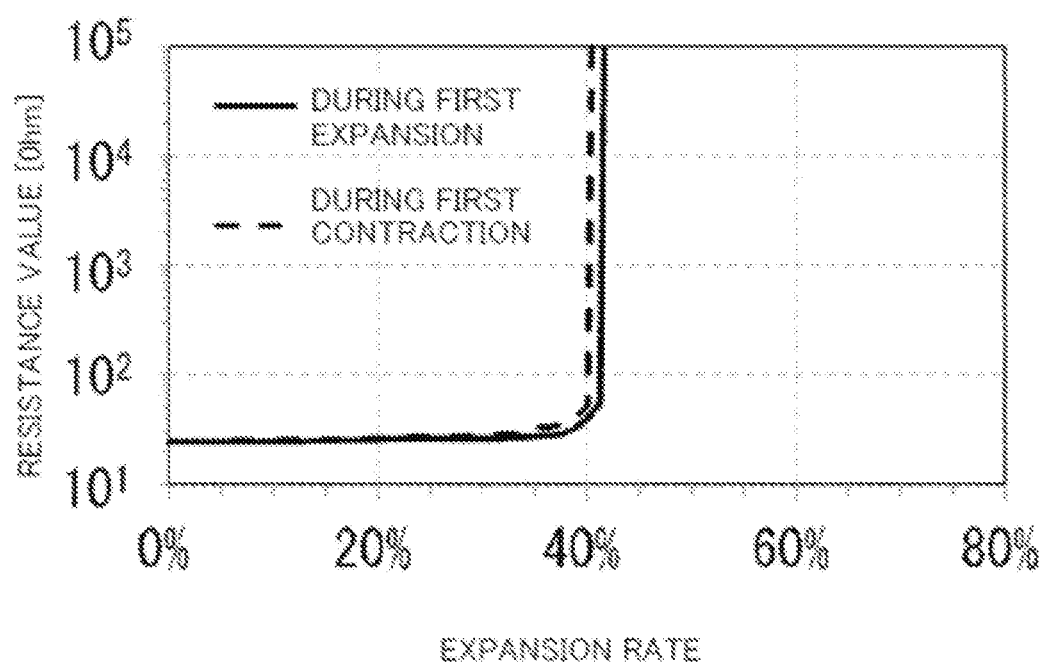
FIG. 10 is a diagram illustrating an example of "a relationship between a resistance value and an expansion rate between a first electrode part and a second electrode part" in a first expansion/contraction based on the results of FIG. 9.

Here, FIG. 9 illustrates an example of "the relationship between resistance value and measurement time between the first electrode part 20A and the second electrode part 20B, and the relationship between expansion rate and measurement time" when a motion to expand the expanding/contracting portion of the finger part 2 to an expansion rate of 70% and then contract the expanding/contracting portion of the finger part 2 (that is, the expanding/contracting portion of the mounting part provided with the detection wiring part), which has the maximum expansion rate (=about 80%), is repeated five times at an expansion speed of 1 mm/s. FIG. 10 illustrates an example of "the relationship between the resistance value and the expansion rate between the first electrode part 20A and the second electrode part 20B" in the first expansion/contraction based on the measurement results of FIG. 9.

As illustrated in FIGS. 9 to 10, when the expanding/contracting portion (that is, the expanding/contracting portion of the mounting part provided with the detection wiring part) of the finger part 2 expands/contracts, the resistance value between the first electrode part 20A and the second electrode part 20B changes with a certain expansion rate as a boundary. Specifically, the first electrode part 20A and the second electrode part 20B shift from a state of conduction therebetween to a state of non-conduction, and then from a state of non-conduction to a state of conduction.

As illustrated in FIGS. 9 to 10, the motion detection member 150 can detect the motion of a finger (bending of the proximal interphalangeal joint of the finger and release thereof) by detecting a change in the resistance value between the first electrode part 20A and the second electrode part 20B that accompanies the expansion and contraction of the expanding/contracting portion of the finger part 2 (that is, the expanding/contracting portion of the mounting part provided with the detection wiring part).

Note that, in the measurement results of the resistance value change illustrated in FIGS. 9 to 10, it is found that when the expansion rate is in the range of about 43.7%±5% on average, the resistance value increases during expansion, and the resistance value decreases during contraction.

<Server>

Next, the server 300 will be described. The server 300 displays hand states (for example, rock, paper, scissors in a rock-paper-scissors game) based on the resistance value detected by the motion detection member 150. That is, because the motion of a finger can be detected by the motion detection member 150, in the motion detection system 1000 of the present embodiment, the motion detection member 150 functions as an input device for displaying hand states. Note that the server 300 is capable of not only displaying hand states but also of outputting voice to describe the hand states.

(Server Configuration)

Figure 11:
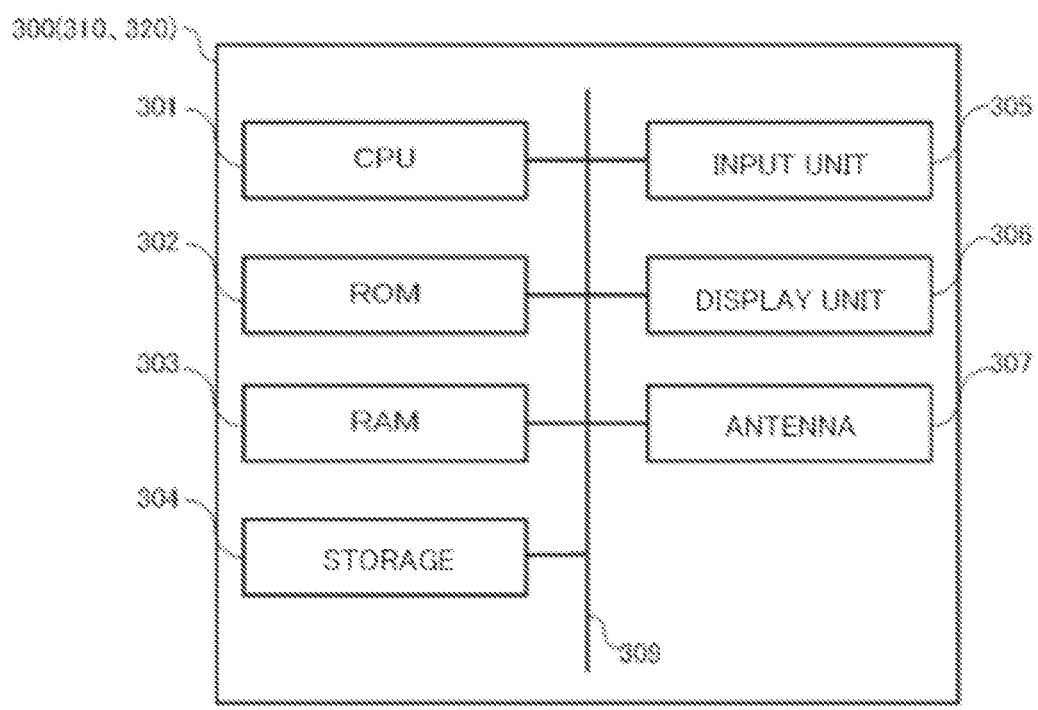
FIG. 11 is a block diagram illustrating an example of a hardware configuration of a server according to the present embodiment.

FIG. 11 is a block diagram illustrating a hardware configuration of the server 300 according to the present embodiment. As illustrated in FIG. 11, the server 300 has a central processing unit (CPU) 301, a read only memory (ROM) 302, a random access memory (RAM) 303, storage 304, an input unit 305, a display unit 306, and an antenna 307. The respective configurations are communicably connected to each other via a bus 309. As the server 300, it is possible to adopt not only a general-purpose computer but also various information processing devices such as a smartphone and a tablet device.

The CPU 301 is a central processing unit, and executes various programs and controls each unit. That is, the CPU 301 reads a program from the ROM 302 or the storage 304, and executes the program using the RAM 303 as a work area. The CPU 301 performs control of each of the foregoing configurations and various types of arithmetic processing according to the program stored in the ROM 302 or the storage 304. In the present embodiment, a motion detection program is stored in the ROM 302 or the storage 304.

The ROM 302 stores various programs and various data. Serving as a work area, the RAM 303 temporarily stores programs or data. The storage 304 is configured from a storage device such as a hard disk drive (HDD) or a solid state drive (SSD), and stores various programs including an operating system, and various data.

The input unit 305 includes a pointing device such as a mouse, and a keyboard, and is used to perform various inputs.

The display unit 306 is, for example, a liquid crystal display, and displays various types of information. The display unit 306 may function as the input unit 305 by adopting a touch panel system.

The antenna 307 is an antenna for performing wireless communication with another device including the motion detection member 150, and is compliant with standards such as IEEE 802.15.1 and IEEE 802.15.4 when directly communicating with another device. Note that, in a case where the antenna 307 performs communication with another device via a wireless base station or a wireless router, for example, a standard such as Wi-Fi (registered trademark) or LTE can be used.

Figure 12:
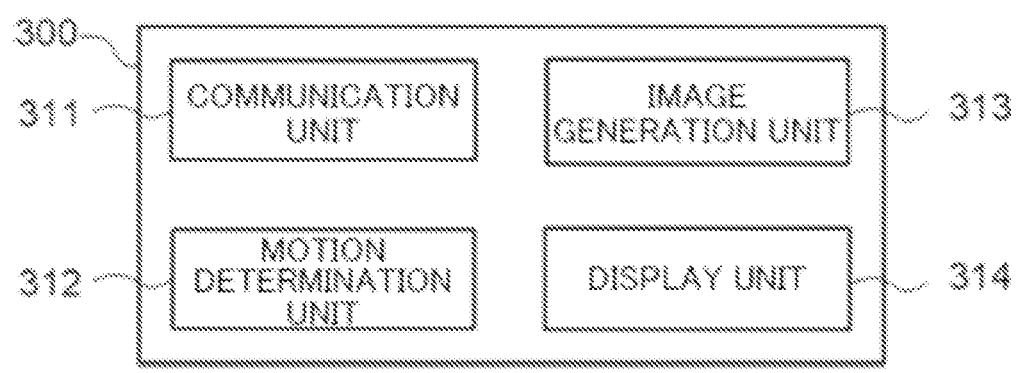
FIG. 12 is a block diagram illustrating an example of a functional configuration of the server according to the present embodiment.

Next, a functional configuration of the server 300 will be described. FIG. 12 is a block diagram illustrating an example of a functional configuration of the server 300. As illustrated in FIG. 12, the server 300 includes, as functional configurations, a communication unit 311, a motion determination unit 312, an image generation unit 313, and a display unit 314. Each functional configuration is realized 1w the CPU 301 reading the motion detection program stored in the ROM 302 or the storage 304, expanding the motion detection program in the RAM 303, and executing the motion detection program.

The communication unit 311 receives a resistance value from the motion detection member 150. The communication unit 311 then delivers the received resistance value to the motion determination unit 312.

The motion determination unit 312 determines the presence or absence of the motion of the mounted body based on the resistance value received from the communication unit 206.

Specifically, when the difference between the predetermined resistance value and the resistance value detected by the resistance detection unit 204 is greater than or equal to a predetermined threshold value, the motion determination unit 312 determines that there is motion of a finger of the hand.

Here, the motion determination unit 312 determines the presence or absence of the motion for each finger, and to identify a particular finger, the configuration is preferably such that resistance value data and information indicating which finger is which are received in advance from the motion detection member 150. The motion determination unit 312 determines the presence or absence of the motion of each finger based on a plurality of resistance values detected by the resistance detection unit 204 provided for each finger, and determines the motion of the person's hand based on the combination of determination results. For example, the motion determination unit 312 determines whether or not there is a motion in the proximal interphalangeal joint and whether or not there is a motion in the metacarpophalangeal joint. The motion determination unit 312 then delivers the determination results to the image generation unit 313.

The image generation unit 313 generates an image corresponding to the motion of the determination results, based on the determination results by the motion determination unit 312. Specifically, in a case where it is determined that there is a motion for the proximal interphalangeal joint, the image generation unit 313 generates an image in which the proximal interphalangeal joint is bent. Note that the configuration may be such that a corresponding image may be selected from among a plurality of images indicating a predetermined hand motion. The image generation unit 313 then delivers the generated image to the display unit 314.

The display unit 314 displays a character string, an image, or a moving image according to the motion generated by the image generation unit 313, plays back sound, or outputs a control signal for controlling a device being operated according to the motion. Specifically, the display unit 314 displays, on the display unit 306, a character string, an image, a moving image, or a sound according to the motion, or a control signal for controlling a device being operated according to the motion. When outputting a character string or voice, the display unit 314 outputs a character string corresponding to the motion, or outputs the result of voice-converting the character string. Here, examples of control signals include input information in IFTTT or the like for performing control by IoT, a control signal for a vehicle steering wheel or a robot, and the like. In this case, the server 300 is connected to another device via communication or connected directly.

(Server Action)

Figure 13:
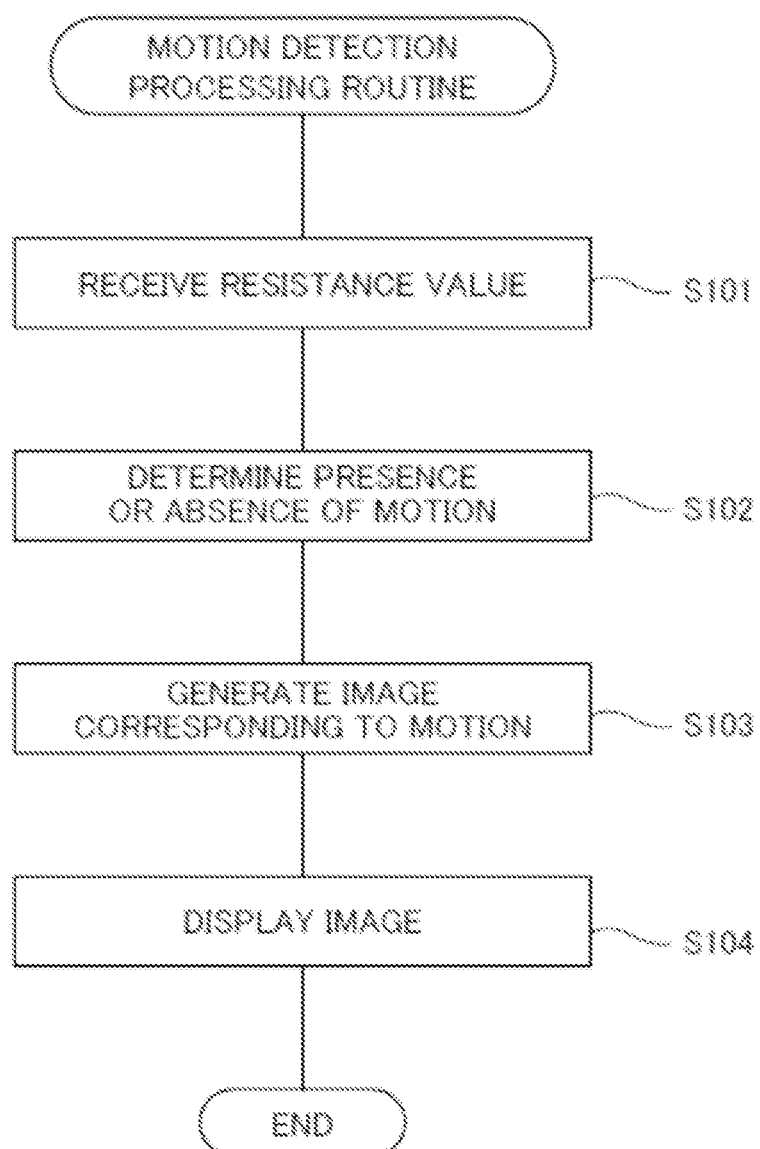
FIG. 13 is a flowchart illustrating a flow of a motion detection processing routine by the server according to the present embodiment.

The action of the server 300 will be described. FIG. 13 is a flowchart illustrating a flow of a motion detection processing routine by the server 300. Processing by the server 300 is performed as a result of the CPU 301 reading the motion detection program from the ROM 302 or the storage 304, expanding the motion detection program in the RAM 303, and executing the motion detection program.

In step S101, the CPU 301, acting as the communication unit 311, receives a resistance value from the motion detection member 150.

In step S102, the CPU 301, acting as the motion determination unit 312, determines the presence or absence of the motion of the mounted body based on the resistance value received from the communication unit 206.

In step S103, the CPU 301, acting as the image generation unit 313, generates an image corresponding to the motion of the determination results, based on the determination results by the motion determination unit 312.

In step S104, the CPU 301, acting as the display unit 314, displays an image corresponding to the motion generated by the image generation unit 313 and ends the processing. The routine is then repeated every time a resistance value is received. Note that a configuration may be employed in which it is determined whether or not the resistance value has been received according to a predetermined period, and the processing is performed in a case where the resistance value has been received.

As described above, the motion detection system of the present disclosure includes the motion detection unit that detects the motion information about the mounted body by using the motion detection member mounted on the mounted body, the communication unit that transmits the motion information detected by the motion detection unit to the server, and the motion determination unit that determines what kind of motion is indicated by the motion information, and hence it is possible to provide the motion detection system that can accurately detect what kind of motion the mounted body has performed.

Here, the motion detection member includes: a mounting part that is mounted on a mounted body, the mounting part having an expanding/contracting portion that expands/contracts due to motion of the mounted body; and a wiring electrode part that, when the expanding/contracting portion of the mounting part expands/contracts, detects expansion/contraction information indicating that the expansion/contraction has taken place. The motion detection member is therefore extremely comfortable to wear, and hence the wearer does not feel uncomfortable when there is motion. Thus, the motion is less affected by the motion detection member. Therefore, the motion can be detected more accurately.

Here, the server can detect an arbitrary motion range by determining the presence or absence of the motion of the mounted body based on the resistance value received from the communication unit. It is also possible to detect multi-stage motion by preparing a plurality of thresholds.

Here, by displaying an image or a moving image corresponding to the motion, it is possible to grasp the state of the mounted body in real time. That is, the present invention can be applied to rehabilitation, confirming motion of a robot arm, and the like.

Furthermore, because it is possible to display a character string, an image, or a moving image according to the motion, play back voice, or output a control signal for controlling a device being operated according to the motion, it is also possible to convert, for example, sign language or the like into characters or voice and recognize the character or the voice. The present invention can also be applied to training such as sign language training.

In addition, by using the expansion/contraction sensor, it is possible to perform the motion detection using a motion detection member that is highly durable and extremely comfortable to wear. That is, it is possible to provide a motion detection system that is extremely comfortable to wear and that is capable of accurately detecting the motion of the hand itself.

(Modification of Wiring Electrode Part)

In the case of the motion detection member 150 according to the present embodiment, the wiring electrode part is not limited to the configuration of the wiring electrode part 100 illustrated in FIG. 4, and may be modified or improved.

Hereinafter, a modification of the wiring electrode part in the motion detection member according to the present embodiment will be described.

Note that, in the following description, as long as the wiring electrode part is the same as the member described in the foregoing embodiment, the wiring electrode part is assigned the same reference sign throughout the drawings, and a description thereof is omitted or simplified.

Further, in the following description, the connection wiring part will be omitted.

First Modification

Figure 14A:
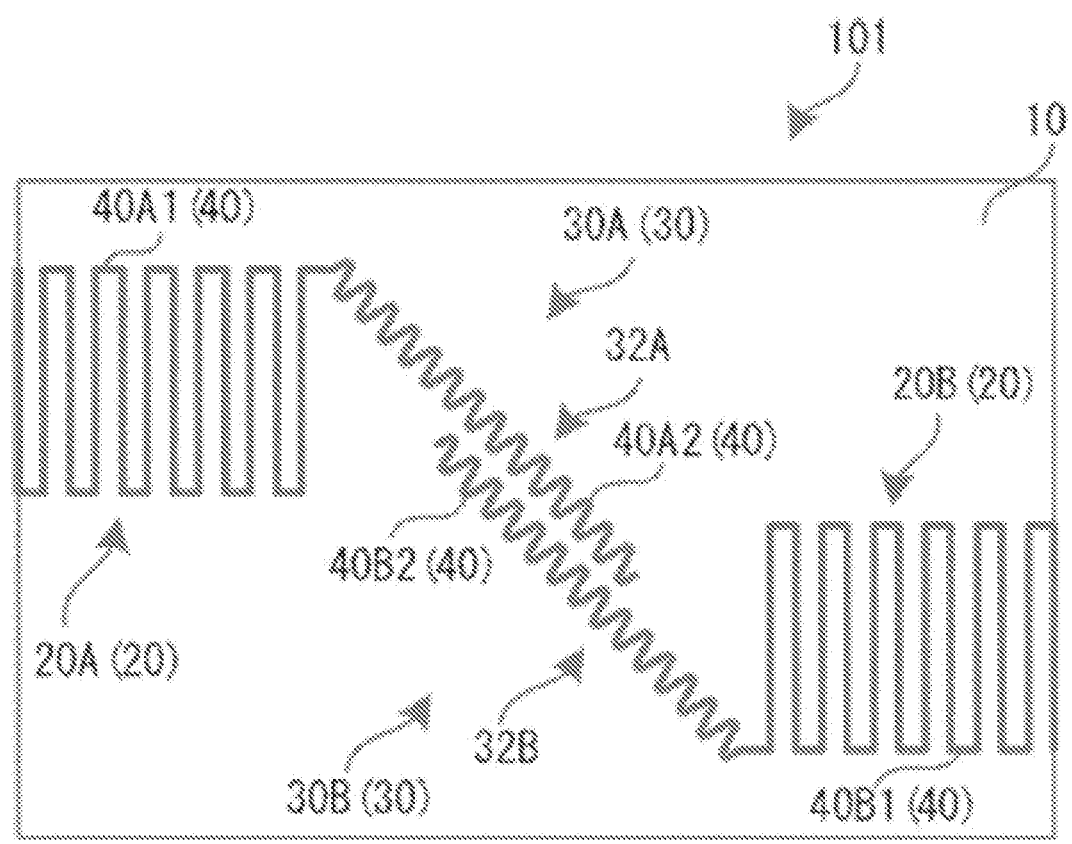
FIG. 14A is a schematic plan view illustrating a wiring electrode part of a first modification.

The wiring electrode part may be, for example, the wiring electrode part 101 illustrated in FIG. 14A.

Specifically, as illustrated in FIG. 14A, in the wiring electrode part 101, the first detection wiring part 30A and the second detection wiring part 30B are provided spaced apart from each other in a state before expansion of the expanding/contracting portion (hereinafter, simply referred to as the "expanding/contracting portion of the mounting part") of the mounting part where the detection wiring part 30 is provided. Further, the wave-shaped part 32A of the first detection wiring part 30A and the wave-shaped part 32B of the second detection wiring part 30B face each other substantially in parallel and are provided spaced apart from each other.

Figure 14B:
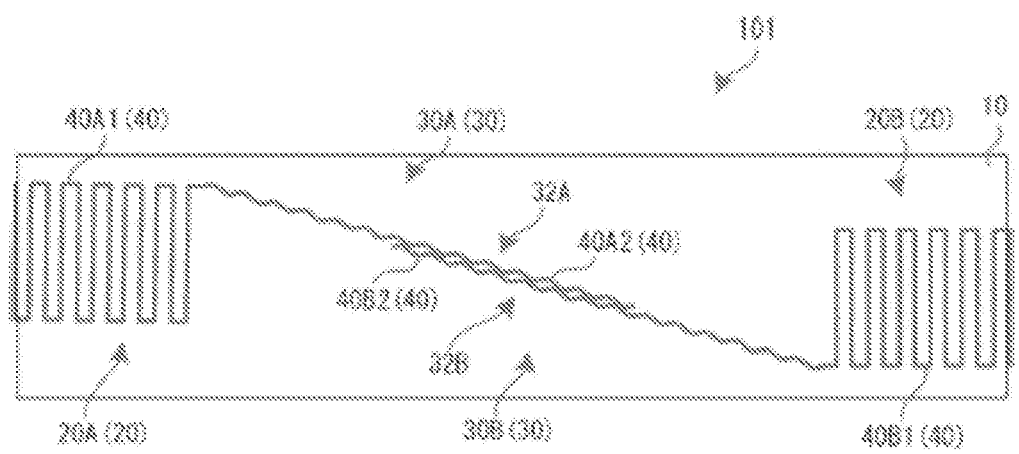
FIG. 14B is a schematic plan view illustrating an expanded state of the wiring electrode part of the first modification.

When the expanding/contracting portion of the mounting part expands due to the motion of the mounted body, at least a portion of the first detection wiring part 30A and the second detection wiring part 30B, which have been spaced apart, come into contact with each other at the moment when a certain expansion rate is reached (see FIG. 14B), Specifically, at least a portion of the conductive linear body 40A2 constituting the first detection wiring part 30A and the conductive linear body 40B2 constituting the second detection wiring part 30B come into contact with each other.

More specifically, when the expanding/contracting portion of the mounting part expands, the period of the wave-shaped part 32A of the first detection wiring part 30A and the wave-shaped part 32B of the second detection wiring part 30B becomes long, and the amplitude thereof becomes small, while close contact is made therebetween.

When the expanding/contracting portion of the mounting part expands due to this motion, the resistance value between the first electrode part 20A and the second electrode part 20B changes. That is, the resistance value is reduced. Specifically, the first electrode part 20A and the second electrode part 2013 shift from a state of non-conduction therebetween to a state of conduction.

The motion of the mounted body can then be detected by detecting the change in resistance value between the first electrode part 20A and the second electrode part 20B that accompanies the expansion.

However, when the expansion of the expanding/contracting portion of the mounting part is released (that is, when the expanding/contracting portion contracts) due to the motion of the mounted body, the first detection wiring part 30A and the second detection wiring part 3013, which have been in contact, are spaced apart from each other at the moment when a certain expansion rate is reached (see FIG. 14A). That is, the resistance value increases. Specifically, the first electrode part 20A and the second electrode part 20B shift from a state of conduction therebetween to a state of non-conduction.

Thus, the motion of the mounted body can be detected by detecting a change in resistance value between the first electrode part 20A and the second electrode part 2013 that accompanies the contraction.

Second Modification

Figure 15A:
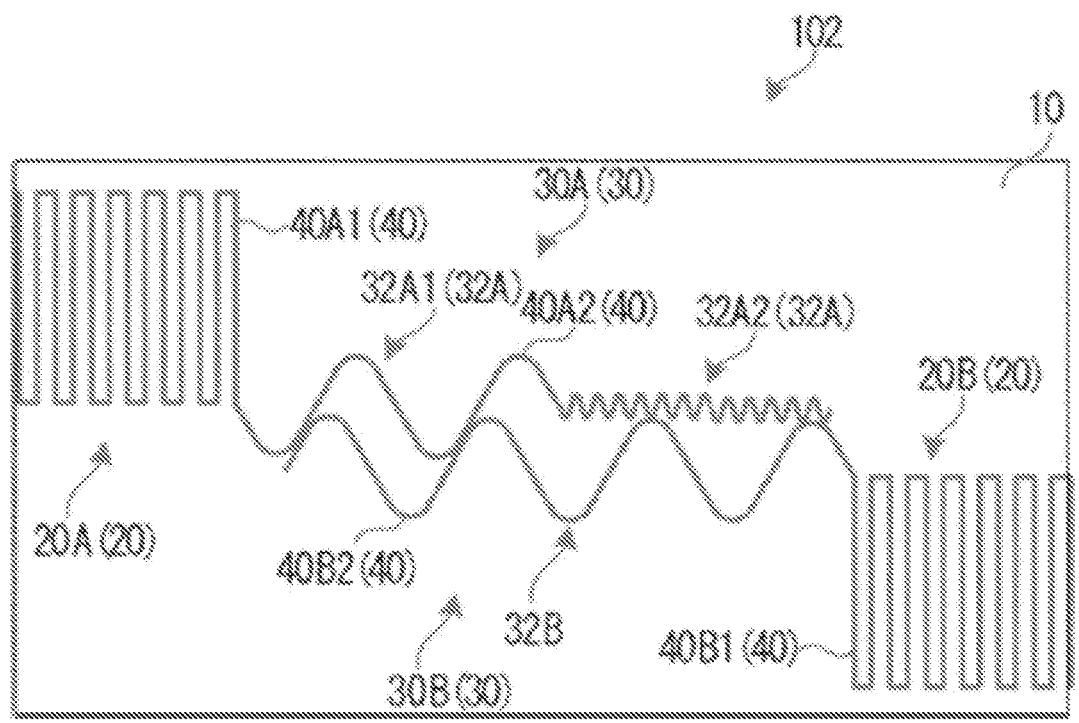
FIG. 15A is a schematic plan view illustrating a wiring electrode part of a second modification.

The wiring electrode part may be, for example, the wiring electrode part 102 illustrated in FIG. 15A.

Specifically, as illustrated in FIG. 15A, the wiring electrode part 102 includes, as the wave-shaped part 32A of the first detection wiring part 30A, a first wave-shaped part 32A1 and a second wave-shaped part 32A2 which has a different contact length with the wave-shaped part 32B of the second detection wiring part 30B than first wave-shaped part 32A1.

Further, the wiring electrode part 102 has, as the wave-shaped part 32A of the first detection wiring part 30A, a first wave-shaped part 32A1 and a second wave-shaped part 32A2 which has a different period and/or amplitude than the first wave-shaped part 32A1.

Note that the present example represents an example in which the second wave-shaped part 32A2 has a shorter contact length with the wave-shaped part 32B of the second detection wiring part 30B than the first wave-shaped part 32A1. Here, an example is illustrated in which the second wave-shaped part 32A2 has a shorter period and a smaller amplitude than the first wave-shaped part 32A1.

When the expanding/contracting portion (hereinafter, simply referred to as the "expanding/contracting portion of the mounting part") of the mounting part where the detection wiring part 30 is provided expands due to the motion of the mounted body, a portion of the first detection wiring part 30A and of the second detection wiring part 30B, which have been in contact, are spaced apart from each other at the moment when a certain expansion rate is reached (see FIG. 15B). Specifically, the second wave-shaped part 32A2 of the first detection wiring part 30A and the wave-shaped part 32B of the second detection wiring part 30B are spaced apart from each other.

Figure 15B:
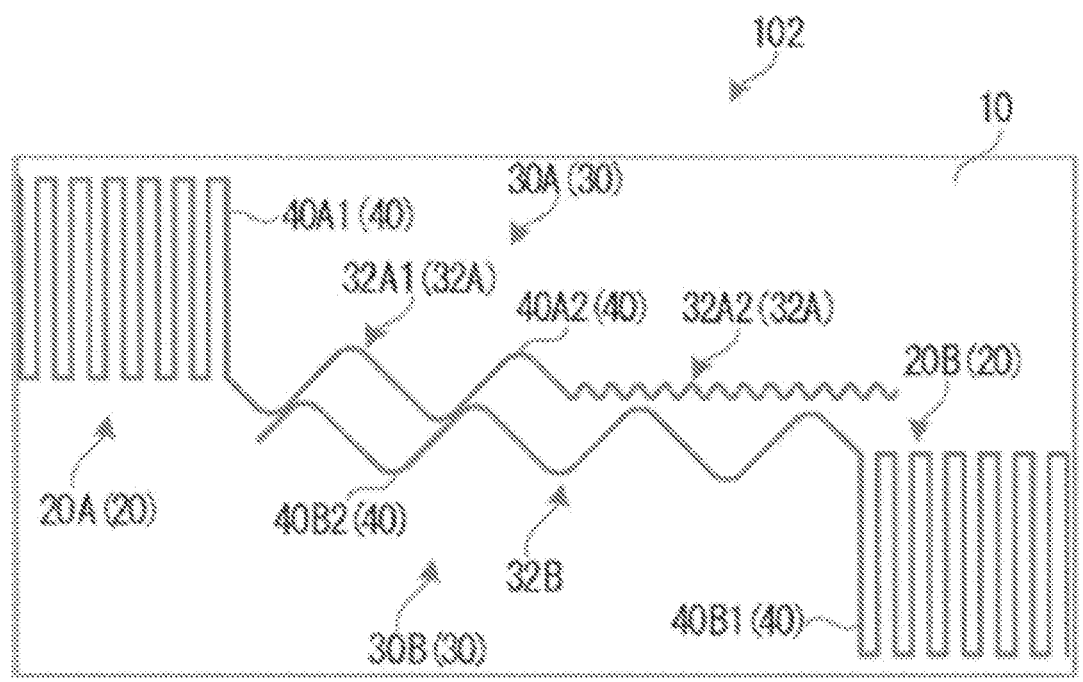
FIG. 15B is a schematic plan view illustrating a first expanded state of the wiring electrode part of the second modification.
Figure 15C:
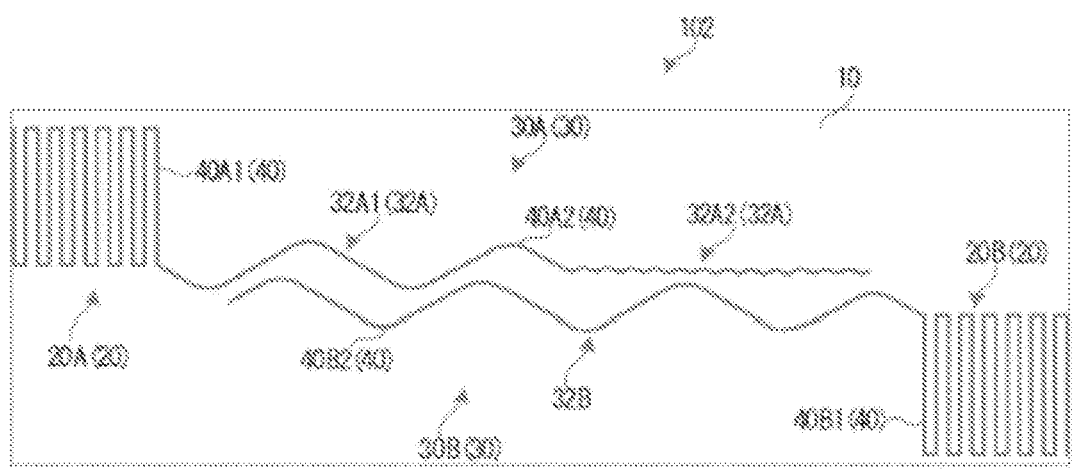
FIG. 15C is a schematic plan view illustrating a second expanded state of the wiring electrode part of the second modification.

When the expanding/contracting portion expands further, the second wave-shaped part 32A2 of the first detection wiring part 30A and the wave-shaped part 3213 of the second detection wiring part 30B are spaced apart from each other at the moment when a certain expansion rate is reached (see FIG. 15C).

That is, the second wave-shaped part 32A2 of the first detection wiring part 30A and the wave-shaped part 32B of the second detection wiring part 30B are spaced apart first, and the first wave-shaped part 32A1 of the first detection wiring part 30A and the wave-shaped part 32B of the second detection wiring part 30B are spaced apart subsequently.

When the expanding/contracting portion of the mounting part expands due to this motion, the resistance value between the first electrode part 20A and the second electrode part 2013 gradually changes. That is, the resistance value gradually increases in proportion to the increase in the contact resistance due to the partial separation between the first detection wiring part 30A and the second detection wiring part 30B. Specifically, in a conductive state between the first electrode part 20A and the second electrode part 20B, the resistance value increases by a certain value, and then the conductive state is changed to a non-conductive state.

The gradual motion of the mounted body can then be detected by detecting the change in resistance value between the first electrode part 20A and the second electrode part 20B that accompanies the expansion.

However, when the expansion of the expanding/contracting portion of the mounting part is released (that is, when the expanding/contracting portion contracts) due to the motion of the mounted body, the first wave-shaped part 32A1 of the first detection wiring part 30A and the wave-shaped part 32B of the second detection wiring part 30B, which have been spaced apart, come into contact with each other at the moment when a certain expansion rate is reached (see FIG. 15B).

Further, when the expanding/contracting portion contracts, the second wave-shaped part 32A2 of the first detection wiring part 30A and the wave-shaped part 32B of the second detection wiring part 30B, which have been spaced apart, come into contact with each other at the moment when a certain expansion rate is reached (see FIG. 15A). That is, the resistance value is gradually reduced.

Specifically, the first electrode part 20A and the second electrode part 20B shift from a state of non-conduction therebetween to a state of conduction, whereupon the resistance value is reduced in the conductive state.

Thus, the gradual motion of the mounted body can be detected by detecting a gradual change in the resistance value between the first electrode part 20A and the second electrode part 20B that accompanies the contraction.

Here, a second modification may have a plurality of regions having mutually different contact lengths in the contact section between the wave-shaped part 32A of the first detection wiring part 30A and the wave-shaped part 32B of the second detection wiring part 30B, according to an intended gradual change in the resistance value between the first electrode part 20A and the second electrode part 20B, The first detection wiring part 30A and/or second detection wiring part 30B may have a plurality of wave-shaped parts having different cycles and/or amplitudes.

Note that the gradual change in the resistance value (that is, the gradual increase or decrease) indicates that the resistance value changes in the course of expansion of the expanding/contracting portion of the mounting part, and the resistance value changes again once the resistance value change is complete.

Third Modification

Figure 16A:
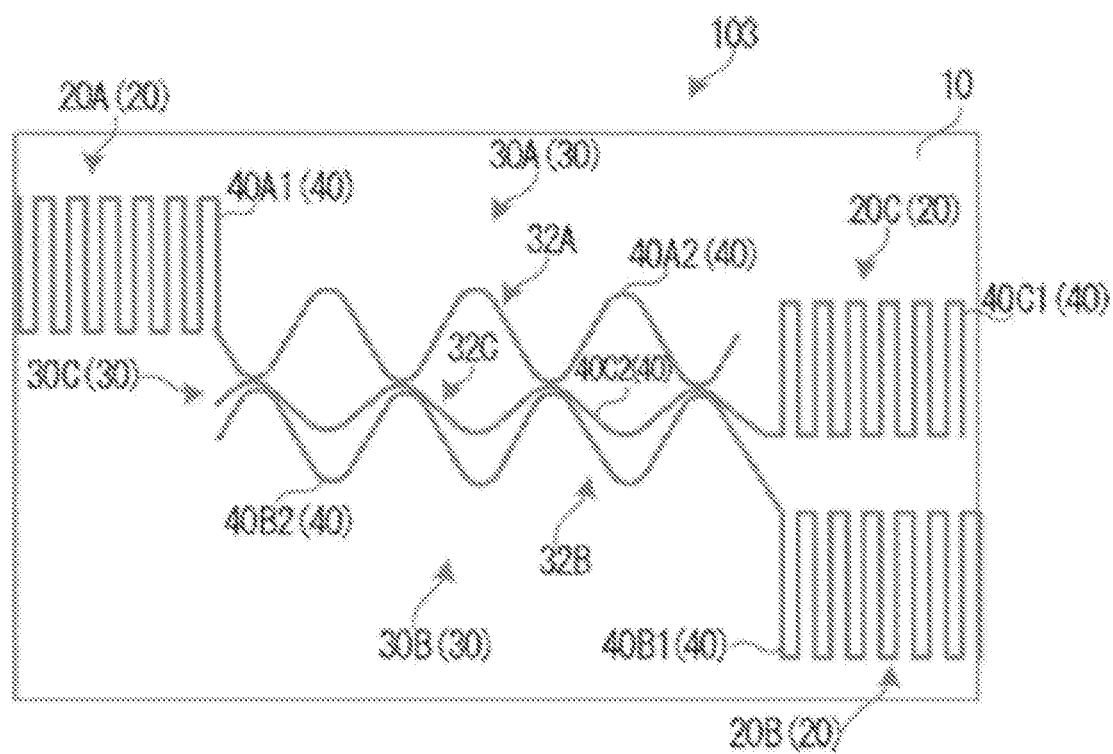
FIG. 16A is a schematic plan view illustrating a wiring electrode part of a third modification.

The wiring electrode part may be, for example, the wiring electrode part 103 illustrated in FIG. 16A. Specifically, as illustrated in FIG. 16A, the wiring electrode part 103 further includes a third electrode part 20C as electrode part 20, and a third detection wiring part 30C as the detection wiring part 30.

The third electrode part 20C includes a conductive linear body 40C1. The third detection wiring part 30C includes a conductive linear body 40C2 obtained by extending the conductive linear body 40C1 of third electrode part 20C. That is, the third electrode part 20C and the third detection wiring part 30C are configured from at least the same conductive linear body 40.

The third detection wiring part 30C is electrically connected to the third electrode part 20C.

The third detection wiring part 30C is provided separately from the first detection wiring part 30A and the second detection wiring part 30B, is interposed between the first detection wiring part 30A and the second detection wiring part 30B, and is in contact with at least a portion of the first detection wiring part 30A and the second detection wiring part 30B, in a state before expansion of the expanding/contracting portion (hereinafter, simply referred to as the "expanding/contracting portion of the mounting part") of a mounting part provided with the detection wiring part 30.

The third detection wiring part 30C has, for example, a wave-shaped part 32C in which the conductive linear body 40C2 is provided in a wave shape.

In the state before expansion of the expanding/contracting portion of the mounting part, the wave-shaped part 32C of the third detection wiring part 30C is in point contact or line contact with the wave-shaped part 32A of the first detection wiring part 30A and the wave-shaped part 32B of the second detection wiring part 30B.

However, the contact length between the wave-shaped part 32C of the third detection wiring part 30C and the wave-shaped part 32A of the first detection wiring part 30A is different from the contact length between the wave-shaped part 32C of the third detection wiring part 30C and the wave-shaped part 32B of the second detection wiring part 30B. The cycles and/or amplitudes of the wave-shaped part 32C of the third detection wiring part 30C, the wave-shaped part 32A of the first detection wiring part 30A, and the wave-shaped part 32B of the second detection wiring part 30B are different.

Note that, in this example, the contact length between the wave-shaped part 32C of the third detection wiring part 30C and the wave-shaped part 32A of the first detection wiring part 30A is shorter than the contact length between the wave-shaped part 32C of the third detection wiring part 30C and the wave-shaped part 32B of the second detection wiring part 30B. Here, an example is illustrated in which the wave-shaped part 32C of the third detection wiring part 30C has a smaller amplitude than the wave-shaped part 32A of the first detection wiring part 30A and the wave-shaped part 32B of the second detection wiring part 30B.

Figure 16B:
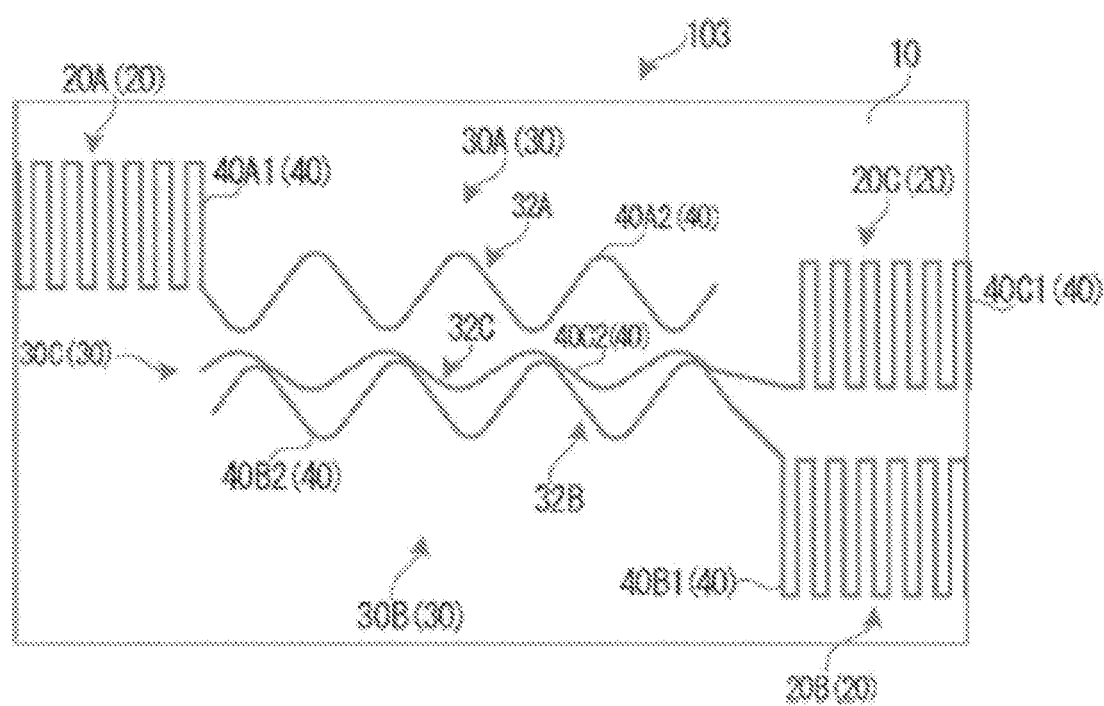
FIG. 16B is a schematic plan view illustrating a first expanded state of a wiring electrode part of the third modification.

When the expanding/contracting portion of the mounting part expands, the first detection wiring part 30A and the third detection wiring part 30C, which have been in contact, are spaced apart from each other at the moment when a certain expansion rate is reached (see FIG. 16B). Specifically, the wave-shaped part 32A of the first detection wiring part 30A and the wave-shaped part 32C of the third detection wiring part 30C are spaced apart from each other.

Figure 16C:
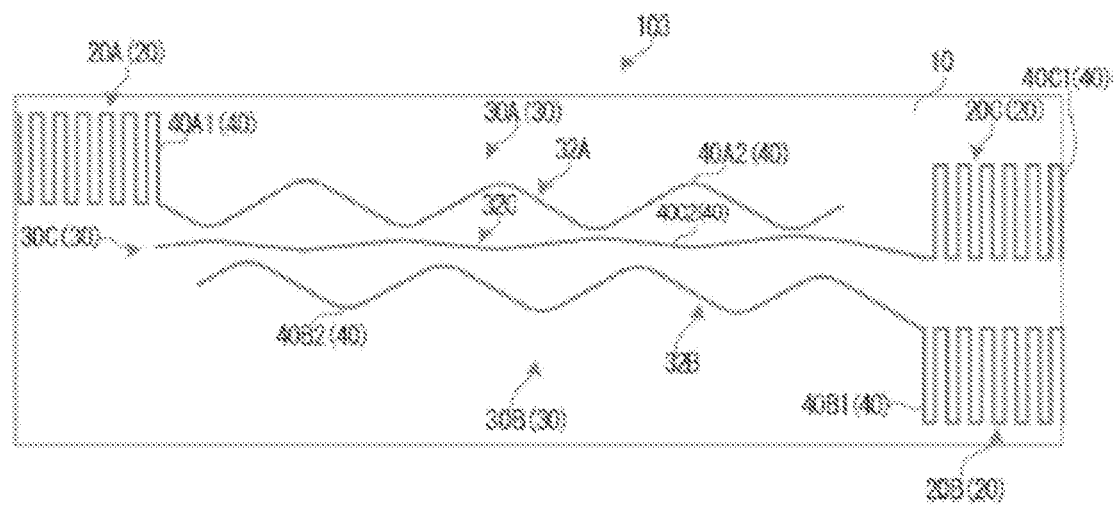
FIG. 16C is a schematic plan view illustrating a second expanded state of the wiring electrode part of the third modification.

When the expanding/contracting portion expands further, the second detection wiring part 30B and the third detection wiring part 30C, which have been in contact, are spaced apart from each other at the moment when a certain expansion rate is reached (see FIG. 16C). Specifically, the wave-shaped part 32B of the second detection wiring part 30B and the wave-shaped part 32C of the third detection wiring part 30C are spaced apart from each other.

That is, the first detection wiring part 30A and the third detection wiring part 30C are spaced apart first, and the second detection wiring part 30B and the third detection wiring part 30C are spaced apart subsequently.

When the expanding/contracting portion of the mounting part expands due to this motion, the resistance value between the first electrode part 20A and the second electrode part 20C changes. That is, the resistance value increases. Specifically, the first electrode part 20A and the second electrode part 20C shift from a state of conduction therebetween to a state of non-conduction.

When the expanding/contracting portion expands further, the resistance value between the second electrode part 20B and the third electrode part 20C changes. That is, the resistance value increases. Specifically, the second electrode part 20B and the third electrode part 20C shift from a state of conduction therebetween to a state of non-conduction.

The motion of the mounted body can then be detected by detecting a change in the resistance value between the first electrode part 20A and the third electrode part 20C and a change in the resistance value between the second electrode part 20B and the third electrode part 20C that accompanies the expansion.

However, when the expansion of the expanding/contracting portion of the mounting part is released (that is, when the expanding/contracting portion contracts) due to the motion of the mounted body, the second detection wiring part 30B and third detection wiring part 30C, which have been spaced apart, come into contact with each other at the moment when a certain expansion rate is reached (see FIG. 16B). Specifically, the wave-shaped part 32B of the second detection wiring part 30B and the wave-shaped part 32C of the third detection wiring part 30C come into contact with each other.

When the expanding/contracting portion contracts further, the first detection wiring part 30A and the third detection wiring part 30C, which have been spaced apart, come into contact with each other at the moment when a certain expansion rate is reached (see FIG. 16A). Specifically, the wave-shaped part 32A of the first detection wiring part 30A and the wave-shaped part 32C of the third detection wiring part 30C come into contact with each other.

That is, the second detection wiring part 30B and the third detection wiring part 30C come into contact with each other first, and the first detection wiring part 30A and the third detection wiring part 30C come into contact with each other subsequently.

Thus, the gradual motion of the mounted body can be detected by detecting a change in the resistance value between the first electrode part 20A and the third electrode part 20C and a change in the resistance value between the second electrode part 20B and the third electrode part 20C that accompanies the contraction.

Note that, in a third modification, the second detection wiring part SOB and the third detection wiring part 30C may be separated first, and the first detection wiring part 30A and the third detection wiring part 30C may be separated subsequently.

Fourth Modification

Figure 17A:
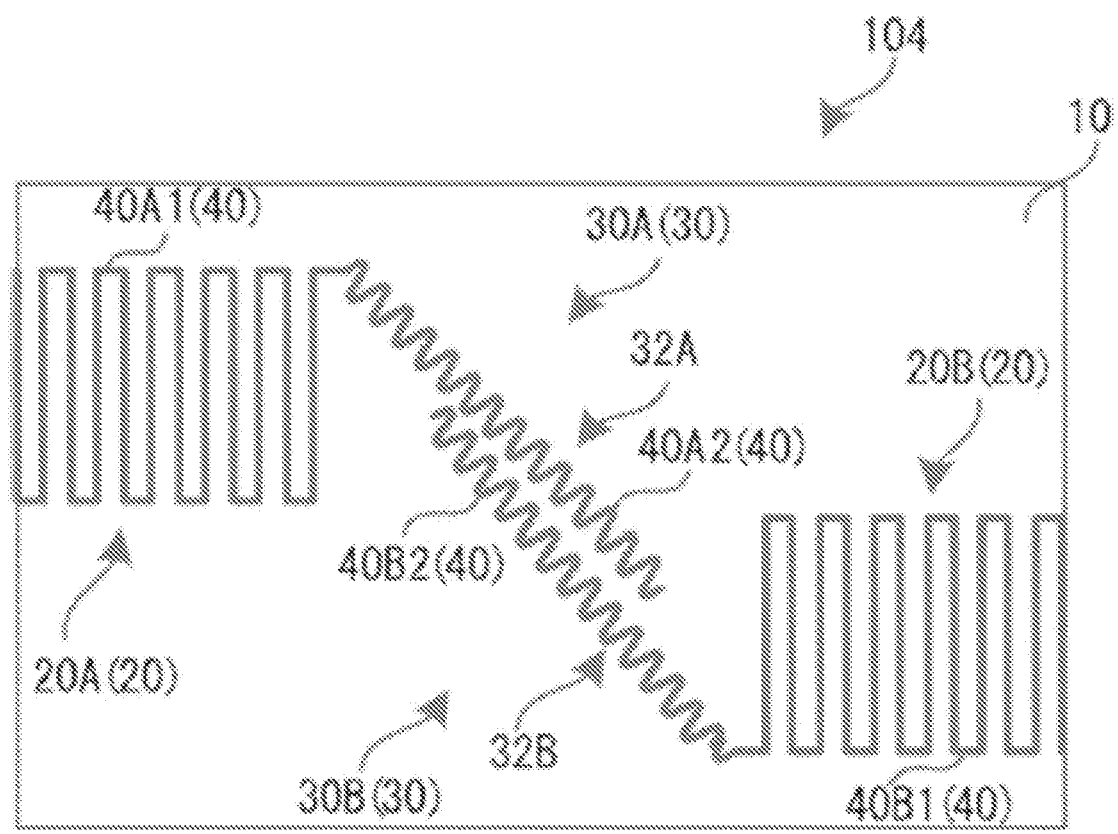
FIG. 17A is a schematic plan view illustrating a wiring electrode part of a fourth modification.

The wiring electrode part may be, for example, the wiring electrode part 104 illustrated in FIG. 17A.

Specifically, as illustrated in FIG. 17A, in the wiring electrode part 104, the first detection wiring part 30A and the second detection wiring part 30B are provided spaced apart from each other in a state before expansion of the expanding/contracting portion (hereinafter, simply referred to as the "expanding/contracting portion of the mounting part") of the mounting part where the detection wiring part 30 is provided. Further, the wave-shaped part 32A of the first detection wiring part 30A and the wave-shaped part 32B of the second detection wiring part 30B face each other at an angle (for example, the angle formed by the direction of extension of each wave-shaped part ranges from 3° to 30°) and are provided spaced apart from each other.

Figure 17B:
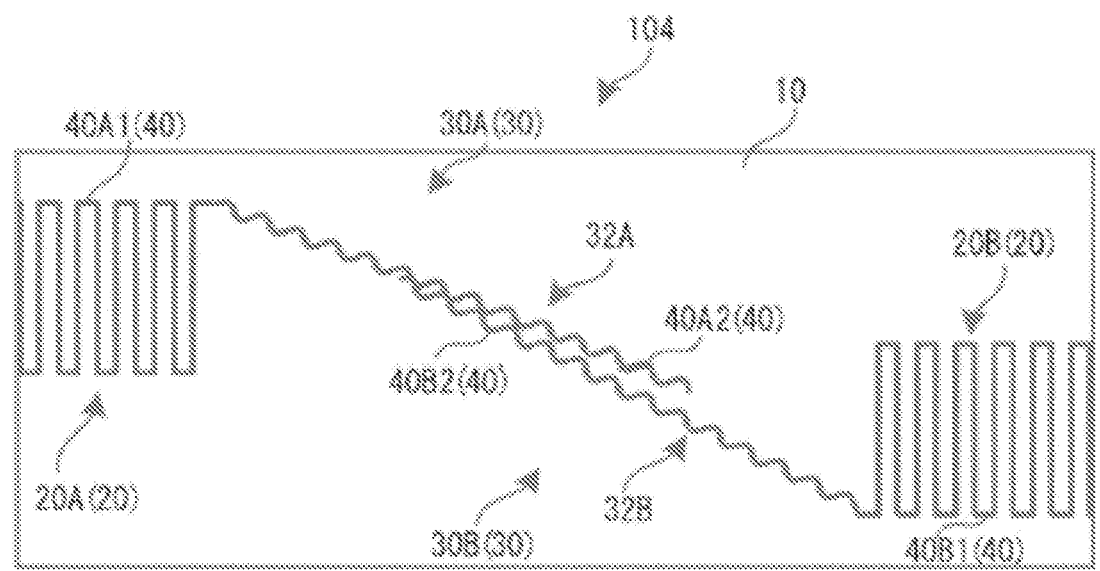
FIG. 17B is a schematic plan view illustrating a first expanded state of the wiring electrode part of the fourth modification.

When the expanding/contracting portion of the mounting part expands due to the motion of the mounted body, at least a portion of the first detection wiring part 30A and the second detection wiring part 30B, which have been spaced apart, come into contact with each other at the moment when a certain expansion rate is reached (see FIG. 17B). Specifically, at least a portion of the conductive linear body 40A2 constituting the first detection wiring part 30A and the conductive linear body 40B2 constituting the second detection wiring part 30B come into contact with each other.

More specifically, when the expanding/contracting portion of the mounting part expands, the wave-shaped part 32A of the first detection wiring part 30A and the wave-shaped part 32B of the second detection wiring part 30B come into close contact with the wave-shaped part 32A of the first detection wiring part 30A from the tip side (the tip side not connected to the second electrode part 20B) of the wave-shaped part 32B of the second detection wiring part 30B, while the period of the wave-shaped parts 32A and 32B is long and the amplitude thereof is small.

Figure 17C:
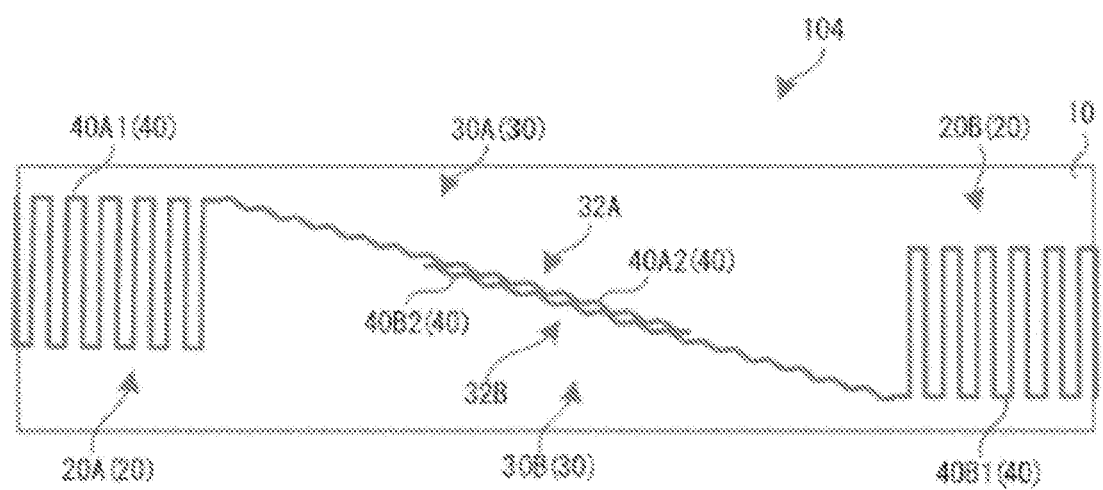
FIG. 17C is a schematic plan view illustrating a second expanded state of the wiring electrode part of the fourth modification.

When the expanding/contracting portion expands further, there is an increase in the contact region between the first detection wiring part 30A and the second detection wiring part 30B (see FIG. 17C). Specifically, there is an increase in the contact region between the conductive linear body 40A2 constituting the first detection wiring part 30A and the conductive linear body 40B2 constituting the second detection wiring part 30B.

More specifically, when the expanding/contracting portion of the mounting part expands, the period of the wave-shaped part 32A of the first detection wiring part 30A and the wave-shaped part 32B of the second detection wiring part 30B becomes long and the amplitude thereof becomes small, while the close contact region increases.

When the expanding/contracting portion of the mounting part expands due to this motion, the resistance value between the first electrode part 20A and the second electrode part 20B gradually changes. That is, when the first detection wiring part 30A and the second detection wiring part 30B first come into contact with each other, the first electrode part 20A and the second electrode part 2011 shift from a non-conductive state therebetween to a conductive state. Next, when the contact region between the first detection wiring part 30A and the second detection wiring part 30B increases, the contact resistance decreases, and the resistance value between the first electrode part 20A and the second electrode part 20B is gradually reduced.

The gradual motion of the mounted body can then be detected by detecting the change in resistance value between the first electrode part 20A and the second electrode part 20B that accompanies the expansion.

However, when the expansion of the expanding/contracting portion of the mounting part is released (that is, contracts) due to the motion of the mounted body, the contact region between the first detection wiring part 30A and the second detection wiring part 30B decreases (FIG. 17B). Further, when the expanding/contracting portion contracts, the first wave-shaped part 32A1 of the first detection wiring part 30A and the wave-shaped part 32B of the second detection wiring part 30B, which have been in contact a, are spaced apart from each other at the moment when a certain expansion rate is reached (see FIG. 17A). That is, the resistance value gradually increases.

Specifically, the resistance value decreases in a conductive state between the first electrode part 20A and the second electrode part 20B, whereupon the first electrode part and the second electrode part are brought into a non-conductive state.

Thus, the gradual motion of the mounted body can also be detected by detecting a gradual change in the resistance value between the first electrode part 20A and the second electrode part 20B that accompanies the contraction.

Fifth Modification

The wiring electrode part may be, for example, the wiring electrode part 105 illustrated in FIG. 15A. Specifically, as illustrated in FIG. 15A, in wiring electrode part 105, the first detection wiring part 30A and the second detection wiring part 30B are integrally provided as the detection wiring part 30. Specifically, for example, the first detection wiring part 30A and the second detection wiring part 30B serving as the detection wiring part 30 are configured from one conductive linear body 40 obtained by extending the conductive linear bodies 40 constituting the first electrode part 20A and the second electrode part 20B.

That is, in the wiring electrode part 105, the first electrode part 20A and the second electrode part 20B are electrically connected by one detection wiring part 30.

Note that the detection wiring part 30 may be configured from a plurality of conductive linear bodies 40.

Midway along the detection wiring part 30, a contact section 34 is provided in which, in a state before expansion of the expanding/contracting portion (hereinafter, simply referred to as the "expanding/contracting portion of the mounting part") of the mounting part provided with the detection wiring part 30, the detection wiring part 30 is repeatedly bent or curved at 180° and at least a portion of the detection wiring parts 30 between the bent parts or the curved parts make contact with each other.

That is, midway along the detection wiring part 30, a contact section 34 is provided in which, in a state before expansion of the expanding/contracting portion of the mounting part, the conductive linear body 40 is repeatedly bent or curved at 180° and at least a portion of the conductive linear bodies 40 between the bent parts or the curved parts make contact with each other.

Figure 18A:
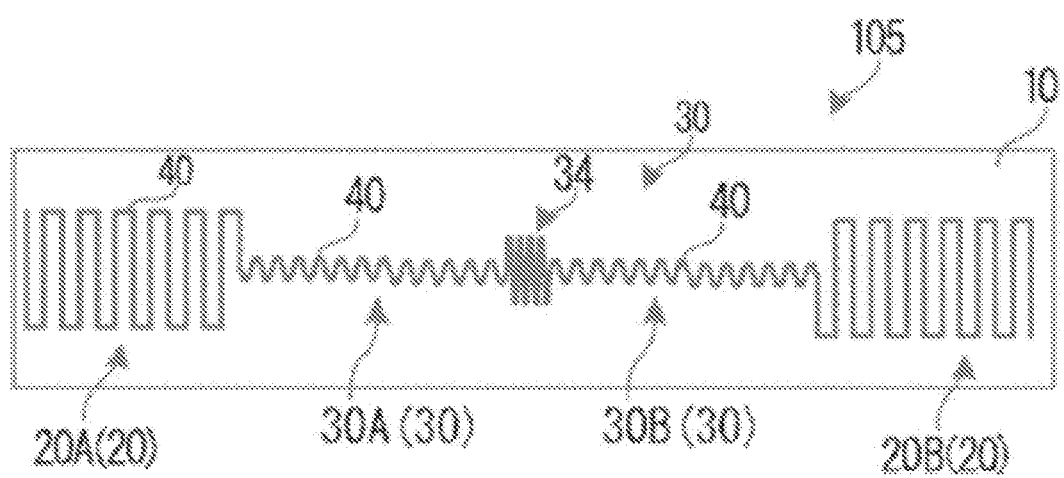
FIG. 18A is a schematic plan view illustrating a wiring electrode part of a fifth modification.
Figure 18B:
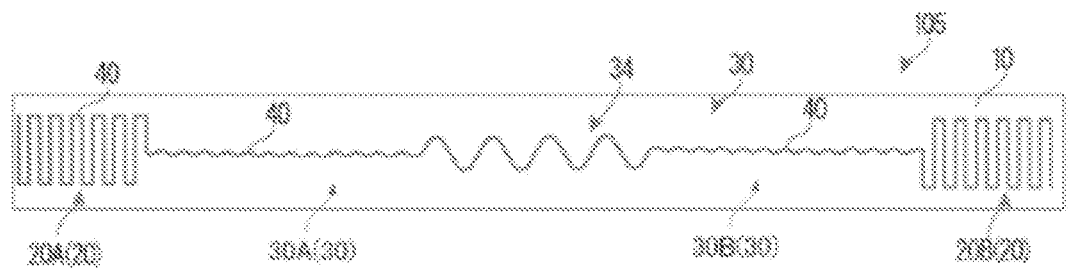
FIG. 18B is a schematic plan view illustrating an expanded state of the wiring electrode part of the fifth modification.

When the expanding/contracting portion of the mounting part expands along the direction of extension of the detection wiring part 30, the detection wiring parts 30, which are in contact between the bent parts or the curved portions, are spaced apart from each other in the contact section 34 of the detection wiring part 30 (see FIG. 18B). Accordingly, a conduction path between the first electrode part 20A and the second electrode part 20B becomes long.

When the expanding/contracting portion of the mourning part expands due to this motion, the resistance value between the first electrode part 20A and the second electrode part 20B changes. That is, the resistance value increases as the conduction path increases.

The motion of the mounted body can then be detected by detecting the change in resistance value between the first electrode part 20A and the second electrode part 20B that accompanies the expansion.

However, when the expansion of the expanding/contracting portion of the mounting part is released (that is, contracted) due to the motion of the mounted body, the detection wiring part 30 is repeatedly bent or curved at 180° midway along the detection wiring part 30, and the contact section 34 is formed in which at least a portion of the detection wiring parts 30 between the bent parts or the curved portions are in contact with each other (see FIG. 18A).

When the expanding/contracting portion of the mounting part contracts due to this motion, the resistance value between the first electrode part 20A and the second electrode part 20B changes. That is, the resistance value is reduced as the conduction path decreases.

The motion of the mounted body can also be detected by detecting a change in resistance value between the first electrode part 20A and the second electrode part 2013 that accompanies the contraction.

Note that, in a fifth modification, the amount of change in the resistance value between the first electrode part 20A and the second electrode part 20B can be controlled by increasing or decreasing the contact surface area between the detection wiring parts 30 in the contact section of the detection wiring part 30.

Sixth Modification

Figure 19:
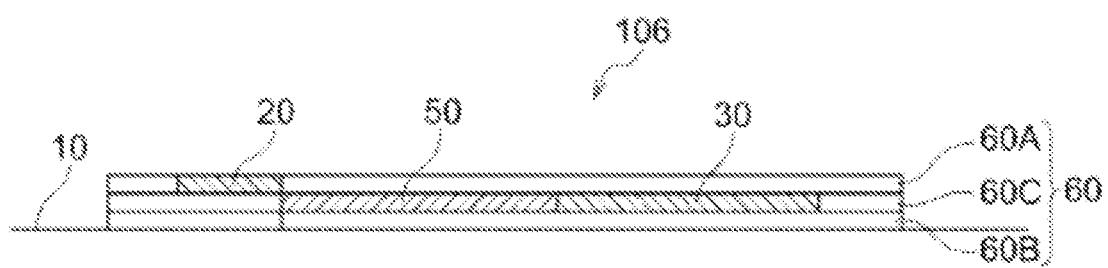
FIG. 19 is a schematic cross-sectional view illustrating a motion detection member of a sixth modification.

The wiring electrode part may be, for example, the wiring electrode part 106 illustrated in FIG. 19. That is, an embodiment may be adopted in which the expanding/contracting portion of the glove-like mounting part provided with the detection wiring part is arranged on the front surface of the corresponding position of the glove-like mounting part.

Specifically, as illustrated in FIG. 19, the wiring electrode part 106 (the electrode part 20, detection wiring part 30, and connection wiring part 50) is provided to the stretchable cloth material 60.

The stretchable cloth material 60 is configured from triple (three layers of) cloth material layers, namely, a front surface cloth material layer 60A constituting a front surface, a back surface cloth material layer 60B constituting a back surface, and an intermediate cloth material layer 60C provided between the front surface cloth material layer 60A and the back surface cloth material layer 60B. Note that the configuration of the stretchable cloth material 60 is similar to the cloth material constituting the glove-like mounting part 10.

The electrode part 20 is provided, for example, on the front surface cloth material layer 60A of the stretchable cloth material 60.

The detection wiring part 30 is provided, for example, on the intermediate cloth material layer 60C of the stretchable cloth material 60.

The connection wiring part 50 is provided, for example, to the intermediate cloth material layer 60C of the stretchable cloth material 60.

The stretchable cloth material 60 provided with the wiring electrode part 106 is disposed on the front surface of the corresponding position of the glove-like mounting part 10 by a well-known fixing means such as sewing or adhesion.

In the sixth modification, because the stretchable cloth material 60 provided with the wiring electrode pan 106 is disposed on the front surface of the corresponding position of the glove-like mounting pan 10, the glove-like mounting part can be configured from a well-known material such as resin, paper, leather, or the like in addition to the cloth material.

Seventh Modification

Figure 20:
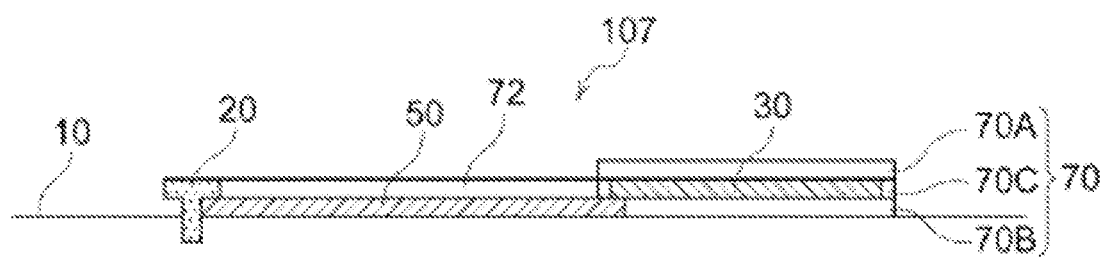
FIG. 20 is a schematic cross-sectional view illustrating a motion detection member of a seventh modification.

The wiring electrode part may be, for example, the wiring electrode part 107 illustrated in FIG. 20. That is, an embodiment may be adopted in which the expanding/contracting portion of the glove-like mounting part provided with the detection wiring part is arranged on the front surface of the corresponding position of the glove-like mounting part.

Specifically, as illustrated in FIG. 20, a button electrode (a snap button or the like) serving as the electrode part 20 is arranged on the surface in the corresponding position of the glove-like mounting part 10 by using a well-known fixing means such as sewing or adhesion.

The detection wiring part 30 is provided to the stretchable cloth material 70.

The stretchable cloth material 70 is configured from triple (three layers of) cloth material layers, namely, a front surface cloth material layer 70A constituting the front surface, a back surface cloth material layer 70B constituting a back surface, and an intermediate cloth material layer 70C provided between the front surface cloth material layer 70A and the back surface cloth material layer 70B. Note that the configuration of the stretchable cloth material 70 is similar to the cloth material constituting the glove-like mounting part 10.

The stretchable cloth material 70 provided with the detection wiring part 30 is provided to the front surface of the glove-like mounting part 10.

The connection wiring part 50 is provided by connecting the electrode part 20 and the detection wiring part 30 to the surface of the glove-like mounting part 10. Here, the connection wiring part 50 is covered with a well-known insulating sheet 72 such as a cloth material or a resin material.

Also in the seventh modification, because the wiring electrode part 107 is disposed on the front surface in the corresponding position of the glove-like mounting part 10, the glove-like mounting part 10 can be configured from a well-known material such as resin, paper, leather, or the like, in addition to the cloth material.

(Characteristics)

Note that, in order to detect the motion of the mounted body, the expanding/contracting portion (hereinafter, simply referred to as the "expanding/contracting portion of the mounting part") of the mounting part provided with the detection wiring part 30 may have an expansion rate range in which the resistance value between the first electrode part 20A and the second electrode part 20B changes to 2 times or more or ½ or less (preferably 10 times or more or ⅒ or less, more preferably 100 times or more or ¹⁄₁₀₀ or less) within a range in which the change in the expansion rate is ±5% (see FIGS. 7 to 8). That is, in the expanding/contracting portion of the mounting part, the resistance value between the first electrode part 20A and the second electrode part 20B may change by 2 times or more or ½ or less while the expansion rate changes by 10% in the course of expansion.

Specifically, when the maximum expansion rate of the expanding/contracting portion of the mounting part is X (where 10≤X), and the expansion rate at a certain point when the expanding/contracting portion of the mounting part is expanded is Y (where, in a case in which 5≤Y≤(X−5)), the expanding/contracting portion may have a region in which the maximum resistance value is 2 times or more, or ½ or less, the minimum resistance value (preferably 10 times or more or ⅒ or less, more preferably 100 times or more or ¹⁄₁₀₀ or less), within the range of Y−5% to Y+5%.

This resistance value change is calculated using the ratio of resistance values at the moment when an intended expansion rate is reached and at the moment when the expansion rate changes by 10% after this moment.

Note that there may be two or more expansion rate ranges in which the resistance value between the first electrode part 20A and the second electrode part 20B changes to 2 times or more or ½ or less within a range in which the change in the expansion rate is ±5%.

Here, the range, for the ratio between the expansion rate and the maximum expansion rate (expansion rate/maximum expansion rate) in which the resistance value between the first electrode part 20A and the second electrode part 20B changes to 2 times or more or ½ or less within a range in which the change in the expansion rate is ±5%, may be 0.1 to 0.9 (preferably 0.2 to 0.8). When the ratio is in the aforementioned range, it is possible to efficiently detect the motion of the mounted body while preventing a malfunction.

The change in the resistance value between the first electrode part 20A and the second electrode part 20B that accompanies the expansion/contraction of the expanding/contracting portion of the mounting part is measured as follows.

While measuring the resistance value between the first electrode part 20A and the second electrode part 20B, the expanding/contracting portion of the mounting part is expanded to the maximum expansion at a speed of 1 mm/s, and then contracted at the same speed until returning to the original state. At such time, the resistance value is plotted every 1 second, and a change in the resistance value is measured. Note that the direction of expansion of the expanding/contracting portion of the mounting part is the direction in which there is a desire to detect a change in resistance value due to expansion/contraction.

Here, the expansion rate of the expanding/contracting portion of the mounting part is calculated using the formula: ((length in the direction of expansion at the time of expansion)−(length in the direction of expansion before expansion))/(length in the direction of expansion before expansion)×100.

Meanwhile, the maximum expansion rate of the expanding/contracting portion of the mounting part is calculated using the formula: ((length in the direction of expansion at the maximum expansion)−(length in the direction of expansion before expansion))/(length in the direction of expansion before expansion)×100.

Note that the maximum expansion of the expanding/contracting portion of the mounting part is the length at the time when the expanding/contracting portion of the mounting part no longer expands when the expanding/contracting portion has expanded using an appropriate tension. That is, the length in a case where the expanding/contracting portion of the mounting part has expanded using the tension at which the expansion stops is taken as the maximum expansion of the expanding/contracting portion of the mounting part.

(Shape of Motion Detection Member (Mounting Part Thereof) and the Like)

Although a case where the shape of the mounting part of the motion detection member 150 is glove-like has been described by way of example in the foregoing embodiments, the present invention is not limited to or such a case. Depending on the purpose of the motion detection, various shapes such as a cylindrical shape, a sheet shape, or a belt shape may be used for the shape of the mounting part.

As a cylindrical mounting part, the shape of a supporter, a wristband, or the like, can be adopted. As a sheet-like mounting part, the shape of a supporter, a wristband, or the like, in which fasteners are provided at both ends and wound around the mounted body, can be adopted. Note that, in the case of a sheet-like mounting part, the embodiment may be such that the sheet-like mounting part is bonded to the mounted body using an adhesive. As a belt-shaped mounting part, the shape of a suspender or the like can be adopted. Note that the shape of the mounting part is selected according to the location for mounting on the mounted body.

Here, examples of locations for mounting on the mounted body include moving parts (neck, wrist, elbow shoulder, knee, waist, ankle, foot, and the like) of a human body serving as the mounted body however, the present invention is not limited to or by such locations. In cases where a human body is not used, an arm of an industrial robot, or a humanoid robot, or the like, may be used.

Thus, the motion detection member according to the present embodiment can be mounted at various locations of the mounted body according to the shape of the mounting part.

As a result, for example, the motion of a moving part of the mounted body (motion in which a moving part such as an elbow or a knee moves at predetermined angle) and the number of motions thereof can be detected. Furthermore, the size of the arm and the waist can be measured. Here, motion can also be detected using a plurality of measurements (for example, the motion of a person can be predicted and detected by measuring, in combination, the neck, the wrist, the elbow the shoulder, the knee, the waist, the ankle, the foot, and the like).

(Modification of Detection Wiring Part)

The motion detection member according to the present embodiment may also be provided with a well-known sensor other than the detection wiring part 30 (for example, a pressure sensor, an acceleration sensor, an angular velocity sensor, a magnetic sensor, or the like). By providing another sensor, superior motion detection is possible.

For example, a pressure sensor makes it possible to measure the pressure on an expanding/contracting member and to determine whether the measured pressure exceeds a predetermined threshold value. Here, for example, the pressure sensor can detect that something has touched or has been touched in detecting pressure when an object is touched or detecting that fingers have made contact, and so forth.

Here, by adopting a time-axis detection-type sensor such as an acceleration sensor, an angular velocity sensor, or a magnetic sensor, the current shape of the mounted body can be measured. A time-axis detection-type sensor can also be combined with the aforementioned expansion/contraction sensor.

(First Modification of Server)

For example, because the motion detection member 150 according to the present embodiment can detect the motion of a finger, same can be used in an input device or the like for operating games and so forth. Hereinafter, as a modification, a case where a motion detection system is used in a game in which it is determined whether or not a hand is in the same state as that on the displayed screen will be described. Note that the same processing as that for the server 300 of the foregoing embodiment is assigned the same reference sign, and hence a description thereof is omitted.

Figure 21:
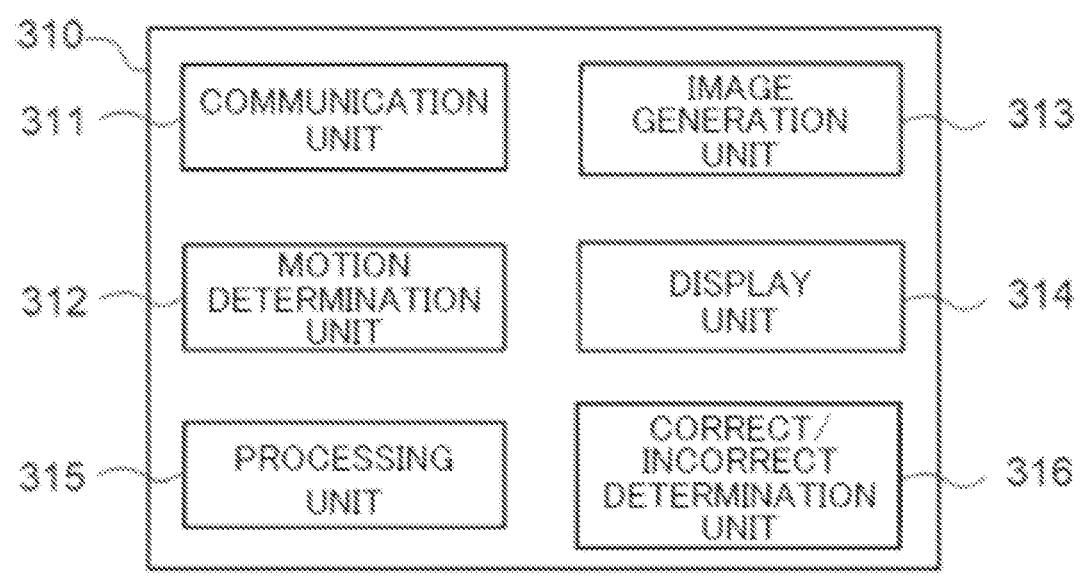
FIG. 21 is a block diagram illustrating an example of a functional configuration of a server according to the first modification.

As illustrated in FIG. 21, a server 310 according to the modification is configured to include a communication unit 311, a motion determination unit 312, an image generation unit 313, a display unit 314, a processing unit 315, and a correct/incorrect determination unit 316.

The display unit 314 displays, on the display unit 306, a sample image of the motion of a hand of a human body, the image being delivered from the processing unit 315. Here, the display unit 314 displays an image corresponding to the determination result by the correct/incorrect determination unit 316 that has been delivered from the processing unit 315.

The processing unit 315 executes the processing of the game for determining whether or not the hand is in the same state as that on the displayed screen. Specifically, the processing unit 315 first randomly selects one pair from a plurality of pairs, which are prepared in advance and include a sample image of the motion of the hand of the human body and a correct motion. Next, the processing unit 315 then delivers the sample image of the selected pair to the display unit 314. The processing unit 315 delivers the correct motion of the selected pair to the correct/incorrect determination unit 316.

Upon receiving the determination result from the correct/incorrect determination unit 316, the processing unit 315 delivers a pre-prepared image corresponding to the determination result to the display unit 314.

The correct/incorrect determination unit 316 determines whether or not the motion determined by the motion determination unit 312 matches the correct motion, which is the motion of the sample image displayed by the display unit 314. Specifically, the correct/incorrect determination unit 316 determines whether the determination result by the motion determination unit 312 matches the correct motion delivered from the processing unit 315. That is, the correct/incorrect determination unit 316 determines that the action matches the correct action and determines that the action is correct in a case where there is match, for all the fingers, with regard to whether a finger of the person is bent. Otherwise, the correct/incorrect determination unit 316 determines that the result is incorrect. The correct/incorrect determination unit 316 then delivers the determination result to the processing unit 315.

(Action of Server of First Modification)

Figure 22:
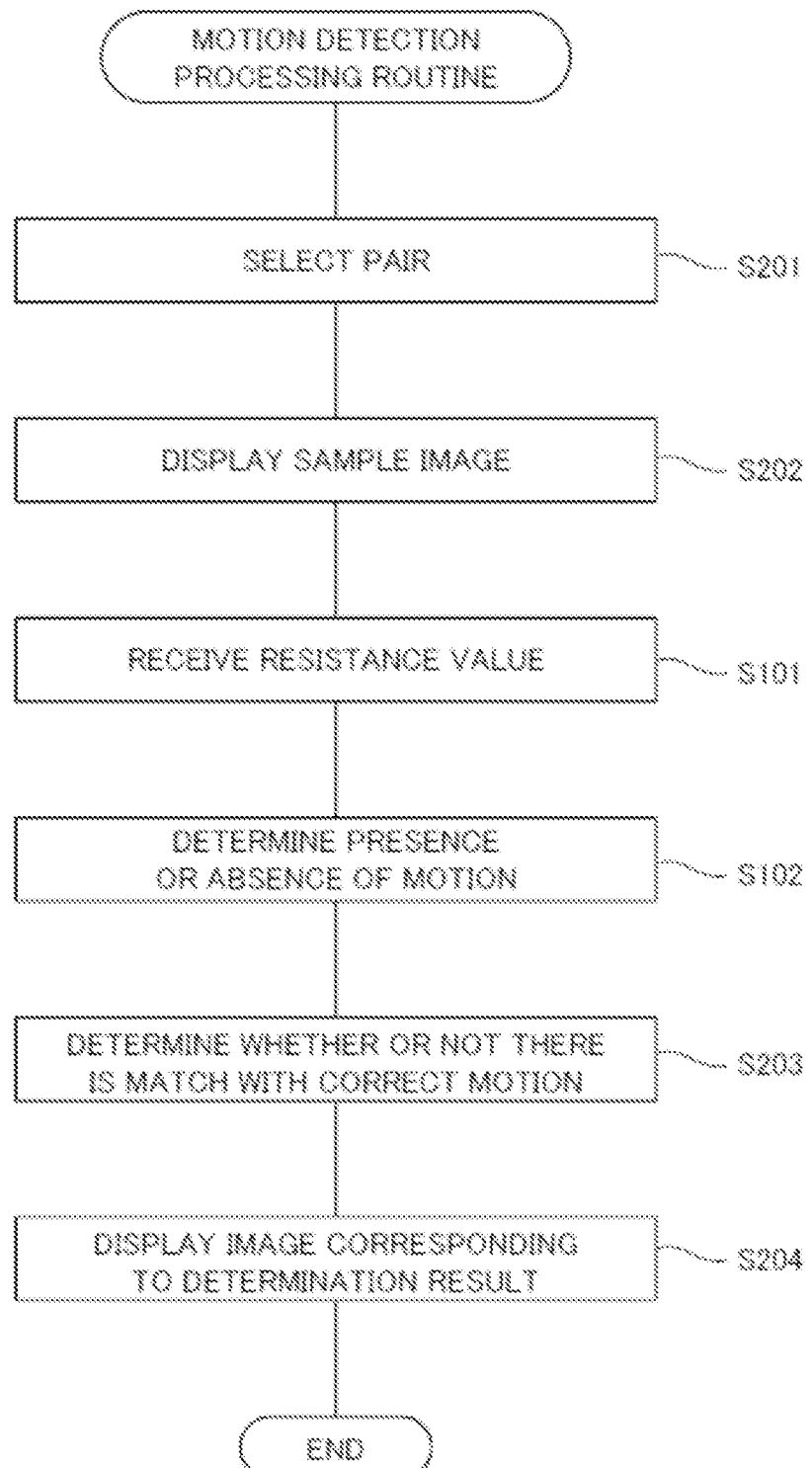
FIG. 22 is a flowchart illustrating a flow of a motion detection processing routine by the server according to the first modification.

Next, the action of the server 310 of the first modification will be described. FIG. 22 is a flowchart illustrating a flow of a motion detection processing routine by the server 310. The motion detection processing routine is performed as a result of the CPU 301 reading the motion detection program from the ROM 302 or the storage 304, expanding the motion detection program in the RAM 303, and executing the motion detection program. Note that the same processing as that for the server 300 is assigned the same reference sign, and hence a description thereof is omitted.

In step S201, the CPU 301 randomly selects, as the processing unit 315, one pair from a plurality of pairs, which are prepared in advance and include a sample image of the motion of the hand of the human body and a correct motion.

In step S200, the CPU 301 displays, on the display unit 306, the sample image of the motion of the hand of the human body selected in step S201 using the display unit 314.

In step S203, the CPU 301, acting as the correct/incorrect determination unit 316, determines whether or not the motion determined in step S102 matches the correct motion, which is the motion of the sample image displayed in step S200.

In step S204, the CPU 301 displays an image corresponding to the determination result of step S203 using the display unit 314, and ends the processing. The routine is then repeated every time a resistance value is received. Note that a configuration may be employed in which it is determined whether or not the resistance value has been received according to a predetermined period, and the processing is performed in a case where the resistance value has been received. Note that the server 310 may be configured to display a sample image or the like on another external terminal.

Note that although an image case has been described by way of example in the present modification, a moving image may be used instead of an image.

Thus, the motion detection system according to the present modification can also be applied to a game by displaying a sample image or a sample moving image of the motion of the hand of the human body, determining whether or not the motion determined by the motion determination unit matches the motion of the displayed sample image or sample moving image, and displaying the determination result. In addition, by preparing a plurality of motion detection systems and coordinating the systems, the present invention can be applied to a game corresponding to the detection results for the motion of a plurality of persons, such as a rock-paper-scissors game.

(Second Modification of Server)

Figure 23:
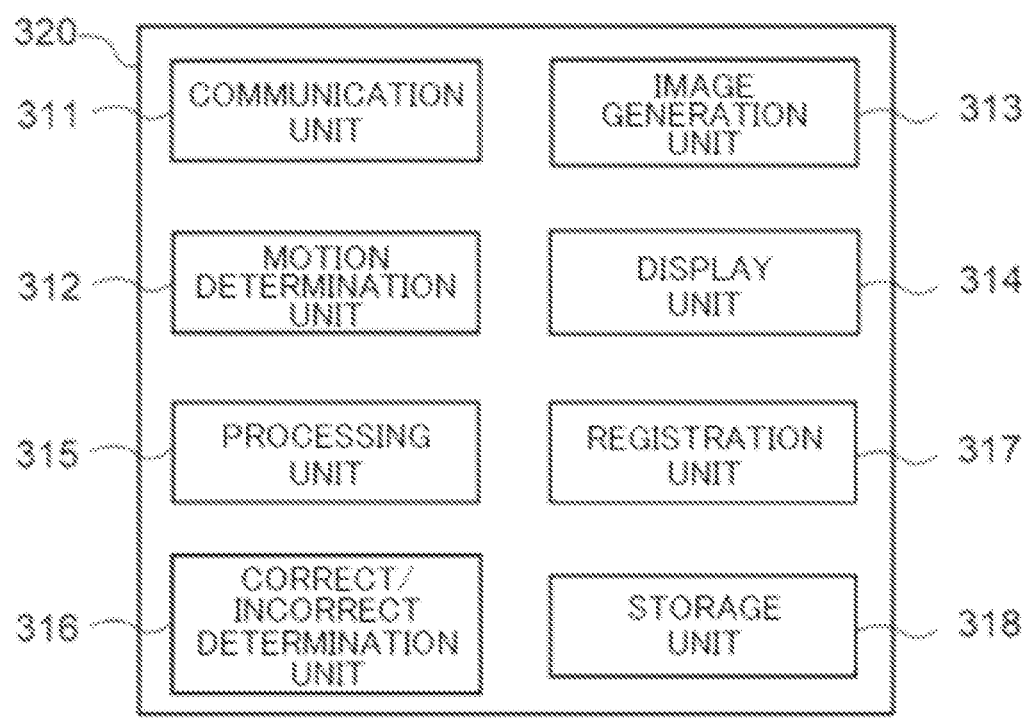
FIG. 23 is a block diagram illustrating an example of a functional configuration of a server according to the second modification.

In the second modification, a case will be described in which motion information and motions are pre-stored in association with each other, and in which the motion determination is performed based on the pre-stored motion information and motions. As illustrated in FIG. 23, the server 320 according to the second modification is configured to include a communication unit 311, a motion determination unit 312, an image generation unit 313, a display unit 314, a processing unit 315, a correct/incorrect determination unit 316, a registration unit 317, and a storage unit 318. Note that the same processing as that for the server 300 of the foregoing embodiment and for the first modification is assigned the same reference sign, and hence a description thereof is omitted.

The registration unit 317 registers the motion information corresponding to each motion in the storage unit 318. For example, the registration unit 317 registers the motion and the motion information in the storage unit 318 in association with each other such that "the motion information of the index finger and the middle finger exceeds a predetermined threshold value, and the motion information of the other fingers is equal to or less than the predetermined threshold value", among the motion information detected by the motion detection member 150 for each of the five fingers, is registered in association with "a motion that takes the form of scissors in rock-paper-scissors".

The storage unit 318 pre-stores motion information corresponding to each motion. Specifically, a motion corresponding to the motion information is registered in the storage unit 318.

The motion determination unit 312 determines, on the basis of the motion information, which motion of a hand of a human body is made. Specifically, when the motion information detected by the motion detection member 150 matches the motion information stored in the storage unit 318, the motion determination unit 312 determines that the motion corresponds to the motion information.

The correct/incorrect determination unit 316 determines whether or not the motion determined by the motion determination unit 312 matches the correct motion, which is the motion of the sample image displayed by the display unit 314. Specifically, the correct/incorrect determination unit 316 determines whether the determination result by the motion determination unit 312 matches the correct motion delivered from the processing unit 315. That is, the correct/incorrect determination unit 316 determines that the motion indicated by the determination result by the motion determination unit 312 matches the correct motion and determines that the motion is correct. Otherwise, the correct/incorrect determination unit 316 determines that the result is incorrect. The correct/incorrect determination unit 316 then delivers the determination result to the processing unit 315.

As described above, the motion detection system according to the present modification can more accurately detect motion by pre-registering the motion information corresponding to each motion, and determining that, when the detected motion information matches the registered motion information, the detected motion is motion corresponding to the motion information.

(Third Modification of Server)

In a third modification, a case will be described in which a time-axis detection-type sensor such as an acceleration sensor, an angular velocity sensor, or a magnetic sensor is adopted. Note that the same processing as that for the server 300 of the foregoing embodiment and for the first and second modifications is assigned the same reference sign, and hence a description thereof is omitted.

In the present modification, a case where the motion information is acceleration information obtained by an acceleration sensor will be described by way of example.

The registration unit 317 receives the motion information as an input, and stores, in the storage unit 318, a motion determination model that outputs motion corresponding to the motion information.

Specifically, the motion determination model is an arbitrary model, and a machine learning model can be adopted in which the motion information and the motion corresponding to the motion information are pre-learned as training data.

For example, in a case where the motion determination model is a neural network, the registration unit 317 pre-learns motion information and motions corresponding to the motion information as training data using, for example, reverse error propagation learning or the like. In this case, for the motion information, for example, acceleration information for each time period from an initial position to a position attained through motion may be expressed as a series of vectors and used as an input. Here, the registration unit 317 stores the learned motion determination model in the storage unit 318.

The storage unit 318 stores the motion determination model.

The motion determination unit 312 determines, as a determination result, motion that is obtained based on the motion information detected by the motion detection member 150, and based on the motion determination model.

As described above, the motion detection system according to the present modification can detect motion more accurately by determining the motion using the motion information detected by the motion detection member 150 and the motion determination model that receives the motion information as an input and outputs the motion corresponding to the motion information.

Note that, in the embodiment, a case where the motion determination unit 312 is configured as the server 300 has been described by way of example, but the present invention is not limited to or by such cases. The motion determination unit 312 may also be configured as the motion detection member 150. In this case, the communication unit 206 may be configured to transmit, to the server 300, the determination result by the motion determination unit 312. The communication unit 311 may be configured to deliver the received determination result to the image generation unit 313.

In the embodiment, the resistance detection unit 204 functions as a motion detection unit that detects motion information of the mounted body by the motion detection member 150 mounted on the mounted body, but the present invention is not limited to this configuration. As a motion detection unit instead of the resistance detection unit 204, an electric signal may be used as is as motion information and delivered to communication unit 206. In this case, the motion detection unit uses the motion detection member to detect, as motion information, the presence or absence of motion of the mounted body, that is, the presence or absence of an electric signal. The motion detection unit may be configured as each of the aforementioned sensors.

Furthermore, the functional configurations described in the embodiments and the modifications may be combined.

Moreover, not only the examples of the foregoing embodiments but also the motion and the outputted target can be freely set. For example, in the case of a motion in which only the index finger is extended, this motion can be set as the motion of turning on a television and outputted as a control signal, for which the number 1 is set and the output is made using a character string or the like.

Here, although a case where the mounted body is a hand has been described by way of example, the present invention is not limited thereto. The present invention is not limited to gloves and hands, and any location is permissible for mounting as long as motion can be detected. For example, mounting can be in a location such as a bend, a fold, or where expansion/contraction takes place.

Here, a case where the mounted body is a human hand has been described by way of example, but the present invention is not limited to or by such a case. For example, an animal or another object such as a machine tool on a robot arm or the like can also be set as a motion detection target.

The disclosure of Japanese Patent Application No. 2020-053263 is incorporated herein by reference in its entirety. Moreover, all documents, patent applications, and technical standards disclosed in the present specification are incorporated herein by reference to the same extent as if the individual documents, patent applications, and technical standards were specifically and individually marked as being incorporated by reference.

REFERENCE SIGNS LIST

10A FRONT SURFACE CLOTH MATERIAL LAYER
10B BACK SURFACE CLOTH MATERIAL LAYER
10C INTERMEDIATE CLOTH MATERIAL LAYER
20 ELECTRODE PART
20A FIRST ELECTRODE PART
20B SECOND ELECTRODE PART
20C THIRD ELECTRODE PART
30 WIRING PART (DETECTION WIRING PART)
30A FIRST WIRING PART (FIRST DETECTION WIRING PART)
30B SECOND WIRING PART (SECOND DETECTION WIRING PART)
30C THIRD WIRING PART
32A WAVE-SHAPED PART (FIRST DETECTION WIRING PART)
32A1 FIRST WAVE-SHAPED PART
32A2 SECOND WAVE-SHAPED PART
32B WAVE-SHAPED PART
32C WAVE-SHAPED PART
34 CONTACT SECTION
40, 40A1 to 3, 40B1 to 3, 40C1, 40C2 CONDUCTIVE LINEAR BODY
50 WIRING PART (CONNECTION WIRING PART)
50A FIRST WIRING PART (FIRST CONNECTION WIRING PART)
50B SECOND WIRING PART (SECOND CONNECTION WIRING PART)
100 to 107 WIRING ELECTRODE PART
150 MOTION DETECTION MEMBER
202 COMMUNICATION MODULE
204 RESISTANCE DETECTION PART
300, 310, 320 SERVER
301 CPU
302 ROM
303 RAM
304 STORAGE
305 INPUT UNIT
306 DISPLAY UNIT
307 ANTENNA
309 BUS
311 COMMUNICATION UNIT
312 MOTION DETERMINATION UNIT
313 IMAGE GENERATION UNIT
314 DISPLAY UNIT
315 PROCESSING UNIT
316 CORRECT/INCORRECT DETERMINATION UNIT
317 REGISTRATION UNIT
318 STORAGE UNIT
1000 MOTION DETECTION SYSTEM

The invention claimed is:

1. A motion detection system, comprising:
a detector that detects motion information regarding a mounted body, via a motion detection member mounted on the mounted body;
a communication device that transmits, to a server, the motion information detected by the detector; and
a processor programed to determine what kind of motion is indicated by the motion information,
wherein the detector detects, as the motion information, presence or absence of motion of the mounted body using the motion detection member,
wherein the motion detection member includes:
a mounting part that is mounted on the mounted body, the mounting part having an expanding/contracting portion that expands/contracts as a result of motion by the mounted body; and
a wiring electrode part that, when the expanding/contracting portion of the mounting part expands/contracts, detects expansion/contraction information indicating that expansion/contraction has taken place,
wherein the wiring electrode part is configured by weaving conductive linear bodies into a woven structure of a woven fabric with warps and wefts, and
wherein the wiring electrode part comprises:
a wiring portion provided at the expanding/contracting portion of the mounting part, the wiring portion having a first wiring part including a first conductive linear body and a second wiring part including a second conductive linear body; and
an electrode part having a first electrode part electrically connected to the first wiring part and a second electrode part electrically connected to the second wiring part, and when the expanding/contracting portion of the mounting part at which the wiring portion is provided expands or contracts as a result of motion by the mounted body, a contact state of the first electrode part and the second electrode part changes, causing a resistance value between the first electrode part and the second electrode part to change, and
the first wiring part and the second wiring part are formed on the same plane.

2. The motion detection system according to claim 1, wherein:
the motion detection member includes at least one of an acceleration sensor, an angular velocity sensor, a magnetic sensor, or a pressure sensor, and
the detector detects, as the motion information, at least one of acceleration obtained by the acceleration sensor, angular velocity obtained by the angular velocity sensor, magnetic information obtained by the magnetic sensor, or pressure information obtained by the pressure sensor.

3. The motion detection system according to claim 1, wherein, when the motion information detected by the detector exceeds a predetermined threshold value, the processor determines that the motion is a motion determined in advance in accordance with a type of the motion information.

4. The motion detection system according to claim 1, wherein the expanding/contracting portion is configured from a stretchable cloth material that expands or contracts as a result of the motion of the mounted body.

5. The motion detection system according to claim 1, further comprising:
a resistance detection unit that detects a resistance value between the first electrode part and the second electrode part,
wherein the communication device transmits, to a server, the resistance value detected by the resistance detection unit.

6. The motion detection system according to claim 1, further comprising:
a storage unit that pre-stores motion information corresponding to respective motions,
wherein the processor determines that, when the motion information detected by the detector matches the motion information stored in the storage unit, the motion is a motion corresponding to the motion information.

7. The motion detection system according to claim 1, further comprising:
a model storage unit that stores a motion determination model that receives the motion information as an input and outputs motion corresponding to the motion information,
wherein the processor determines, as a determination result, motion that is obtained based on the motion information detected by the detector, and based on the motion determination model,
wherein the motion determination model is a machine learning model with which motion information and motions corresponding to the motion information are pre-learned as training data.

8. The motion detection system according to claim 1, further comprising:
a display unit that displays a character string, an image, and a moving image, or and plays a voice that corresponds to the motion determined by the processor, or a control signal for controlling a device operated according to the motion,
wherein:
the motion detection member includes a mounting part that is mounted on a hand of a human body serving as the mounted body,
the processor determines which motion of the hand of the human body is made based on the motion information, and
the display unit outputs a character string, an image, and a moving image, or plays a voice that corresponds to the motion of the hand of the human body determined by the processor, or the control signal.

9. The motion detection system according to claim 5, wherein the server includes the processor that determines the presence or absence of motion of the mounted body based on the resistance value received from the communication device.

10. The motion detection system according to claim 5,
wherein the processor determines the presence or absence of motion of the mounted body based on the resistance value,
wherein the communication device transmits, to the server, a determination result by the processor.

11. The motion detection system according to claim 9, wherein:
the mounting part is a glove-like mounting part that is mounted on a hand of a human body, which is the mounted body,
an expanding/contracting portion provided with the wiring portion, among expanding/contracting portions of the glove-like mounting part, is a portion of a finger of the hand facing the dorsal side of a proximal interphalangeal joint or the dorsal side of a metacarpophalangeal joint, and
when a difference between a predetermined resistance value and the resistance value detected by the resistance detection unit is greater than or equal to a predetermined threshold value, the processor determines that there is motion of a finger of the hand.

12. The motion detection system according to claim 5, wherein:
a plurality of motion detection members are provided, and each of the motion detection members is connected to the resistance detection unit, and
the processor determines the presence or absence of motion of a portion of the mounted body on which each of the plurality of motion detection members is mounted, based on resistance values detected by the resistance detection unit from each of the plurality of motion detection members, and determines the motion of the mounted body based on a combination of determination results for the presence or absence of motion of each of the plurality of motion detection members.

13. The motion detection system according to claim 1, wherein: the first wiring part and the second wiring part are provided separately,
in a case in which a portion of the first wiring part and a portion of the second wiring part are provided in contact with each other before expansion of the expanding/contracting portion of the mounting part, the first wiring part and the second wiring part are spaced apart from each other when the expanding/contracting portion of the mounting part provided with the wiring part expands as a result of the motion of the mounted body, and
in a case in which the first wiring part and the second wiring part are provided spaced apart from each other before expansion of the expanding/contracting portion of the mounting part, at least a portion of the first wiring part and the second wiring part come into contact with each other when the expanding/contracting portion of the mounting part expands as a result of the motion of the mounted body.

14. The motion detection system according to claim 1, wherein:
the first wiring part and the second wiring part are provided separately,
in a case in which at least a portion of the first wiring part and the second wiring part is provided in contact with each other before expansion of the expanding/contracting portion of the mounting part, a contact region between the first wiring part and the second wiring part gradually decreases when the expanding/contracting portion of the mounting part expands as a result of the motion of the mounted body, and
in a case in which the first wiring part and the second wiring part are provided spaced apart from each other before expansion of the expanding/contracting portion of the mounting part, the contact region between the first wiring part and the second wiring part gradually increases when the expanding/contracting portion of the mounting part expands as a result of the motion of the mounted body.

15. The motion detection system according to claim 1, wherein: the first wiring part and the second wiring part are integrally provided, and a conduction path between the first wiring part and the second wiring part lengthens when the expanding/contracting portion of the mounting part expands as a result of the motion of the mounted body.

16. The motion detection system according to claim 1, wherein the expanding/contracting portion has an expansion rate range such that, when the expanding/contracting portion of the mounting part is expanded at a maximum expansion rate, the resistance value between the first electrode part and the second electrode part changes by two times or more or 1/2 or less, within a range in which the change in the expansion rate is +5%.

17. The motion detection system according to claim 1, wherein the conductive linear body included in at least one of the first electrode part, the second electrode part, the first wiring part, or the second wiring part is a conductive linear body that includes a carbon nanotube yarn.

\* \* \* \* \*